United States Patent [19]
Fasanella et al.

[11] Patent Number: 6,058,228
[45] Date of Patent: May 2, 2000

[54] COST-EFFECTIVE SIDE-COUPLING POLYMER FIBER OPTICS FOR OPTICAL INTERCONNECTIONS

[75] Inventors: Kenneth W. Fasanella, Hamilton; Yao Li, Monmouth Junction; Ting Wang, Princeton, all of N.J.

[73] Assignee: NEC Research Institute, Inc., Princeton, N.J.

[21] Appl. No.: 09/023,623

[22] Filed: Feb. 13, 1998

Related U.S. Application Data

[60] Provisional application No. 60/061,132, Oct. 6, 1997.

[51] Int. Cl.⁷ ...................................................... G02B 6/26
[52] U.S. Cl. ................................ 385/17; 385/16; 385/18; 385/24
[58] Field of Search ................................ 385/16, 17, 18, 385/24, 31, 39, 47

[56] References Cited

U.S. PATENT DOCUMENTS

| | | | |
|---|---|---|---|
| 4,173,390 | 11/1979 | Kach | 385/44 |
| 4,346,961 | 8/1982 | Porter | 385/44 |
| 4,690,490 | 9/1987 | Mori | 385/47 |
| 4,872,739 | 10/1989 | Kahn et al. | 385/24 |
| 5,037,172 | 8/1991 | Hekman et al. | 385/31 |
| 5,432,876 | 7/1995 | Appeldorn et al. | 385/31 |
| 5,673,344 | 9/1997 | Li et al. | 385/48 |

FOREIGN PATENT DOCUMENTS

| | | |
|---|---|---|
| 0320251 | 6/1989 | European Pat. Off. . |
| WO 85/00898 | 2/1985 | WIPO . |
| WO 90/02349 | 3/1990 | WIPO . |

OTHER PUBLICATIONS

Y. Koike et al. (1995) "High–bandwidth Graded–index Polymer Optical Fiber" *Journal of Lightwave Technology 13* (7): 1475–1489, Jul. 1995.

S. Yamazaki et al. (1996) "A 2.5 Gb/s 100 m GRIN Plastic Optical Fiber Data Link at 650 nm Wavelength" *Graded Index POF* Boston: Information Gatekeepers: 98–101.

T. Ishgure et al. (1994) "Large–core High–bandwidth Polymer Optical Fiber and Applications" *Technical Digest CLEO/EUROPE '94*: paper CTHD5.

D.J. Ripin et al. (1995) "High Efficiency Side–coupling of Light Into Optical Fibers Using Imbedded V–grooves" *Electron. Lett. 31*: 2204–2205.

J.W. Goodman et al. (1984) "Optical Interconnections for VLSI Systems" *Proceedings of the IEEE 72* (7): 850–865.

R.T. Chen et al. (Jul. 1992) "Guided–wave Planar Optical Interconnects Using Highly Multiplexed Polymer Waveguide Holograms" *Journal of Lightwave Technology 10* (7): 888–897.

J. Jahns (1994) "Diffractive Optical Elements for Optical Computers" *Optical Computing Hardware* eds. J. Jahns and S.H. Lee, Academic Press: New York, New York 137–167.

(List continued on next page.)

*Primary Examiner*—Rodney Bovernick
*Assistant Examiner*—Juliana K. Kang
*Attorney, Agent, or Firm*—Scully, Scott Murphy & Presser

[57] ABSTRACT

A unidirectional and bidirectional optical fiber couplers using polymer optical fibers having mirrors formed within the polymer optical fibers for reflecting optical signals. The mirrors comprise a notch having at least one surface angled with respect to the central axis of the optical fiber for reflecting the optical signal perpendicular to its central axis. A unidirectional embodiment allows input optical signals to be coupled from any combination of input optical fibers and transmitted into any combination of output optical fibers. A bidirectional embodiment allows optical signals from tapping fibers to be reflected in opposite directions along a first, or BUS optical fiber. Another aspect of the present invention is an apparatus and method for controlling the depth of the notch by monitoring residue power through the optical fibers while the notch is being cut.

13 Claims, 16 Drawing Sheets

OTHER PUBLICATIONS

T.J. Stone et al. (Jan. 1994) "Optical Array Generation and Interconnection Using Birefringent Slabs" *Applied Optics 33* (2): 182–191.

Y. Li et al. (Dec. 1996) "4×16 Polymer Fiber Optical Array Couplers" *IEEE Photonics Technology Letters 8* (12): 1650–1652.

B.P. Keyworth et al. (1995) "Dispensed Polymer Microlenses" *1995 OSA Annual Meeting*, Sep. 10–15, 1995 (Portland, Oregon) Talk WVV52.

Y.S. Liu et al. (1996) "Polymer Optical Interconnect Technology (POINT): Optoelectronic Packaging . . ." *Optoelectronic Interconnects and Packaging* (eds. Chen and Guilfoyle) SPIE CR62: 405–414.

Y. Li et al. (Oct. 1996) "Distribution of Light Power and Optical Signals Using Embedded Mirrors Inside Polymer Optical Fibers" *IEEE Photonics Technology Letters 8* (10): 1352–1354.

A.W. Lohmann (1986) "Optical Bus Network" *Optik 74*: 30–35.

C. Zhao et al. (1995) "General Purpose Bidirectional Optical Backplane: High–performance Bus for Multiprocessor Systems" *IEEE Comput. Soc.*: 188–195.

R. Dändliker et al. (Feb. 1985) "How Modal Noise in Multimode Fibers Depends on Source Spectrum and Fiber Dispersion" *IEEE Journal of Lightwave Technology LT–3* (1): 7–12.

$j = i + a, k = i + b, m = i + c$

|  | $O_1$ | $O_2$ | $O_3$ | $O_4$ |
|---|---|---|---|---|
| $I_1$ | // | $\Upsilon_1\alpha^2\Upsilon_3$ | $\Upsilon_1\alpha^2\beta\Upsilon_2$ | $\Upsilon_1\alpha^2\beta^2\Upsilon_1$ |
| $I_2$ | $\Upsilon_3\alpha^2\Upsilon_1$ | // | $\Upsilon_2\alpha^2\Upsilon_2$ | $\Upsilon_2\alpha^2\beta\Upsilon_1$ |
| $I_3$ | $\Upsilon_2\alpha^2\beta\Upsilon_1$ | $\Upsilon_2\alpha^2\Upsilon_2$ | // | $\Upsilon_3\alpha^2\Upsilon_1$ |
| $I_4$ | $\Upsilon_1\alpha^2\beta^2\Upsilon_1$ | $\Upsilon_1\alpha^2\beta\Upsilon_2$ | $\Upsilon_1\alpha^2\Upsilon_3$ | // |

Input (rows) / Output (columns)

FIG. 5

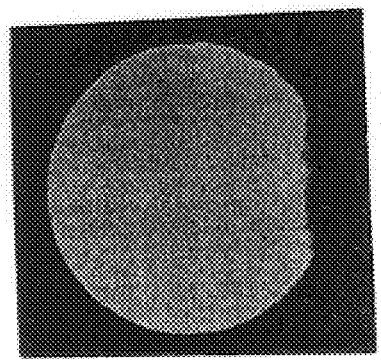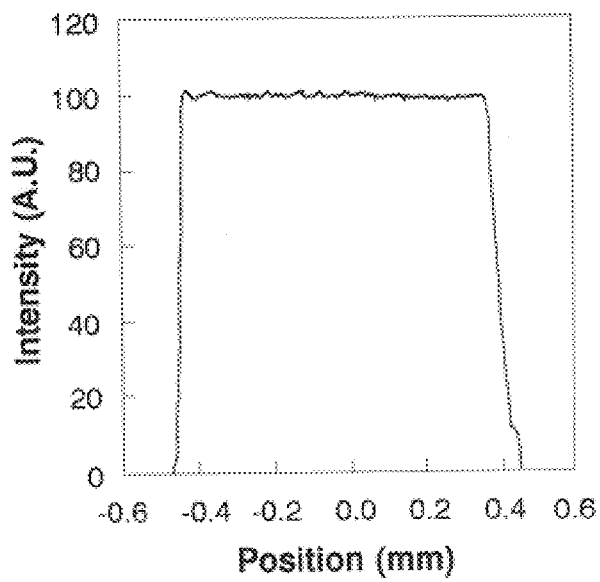
FIG. 8(a)
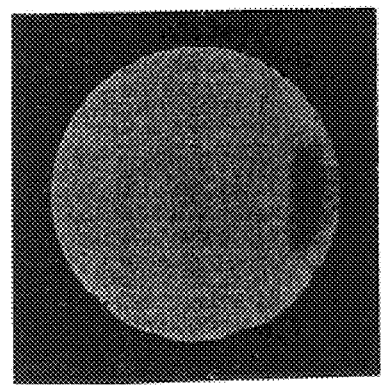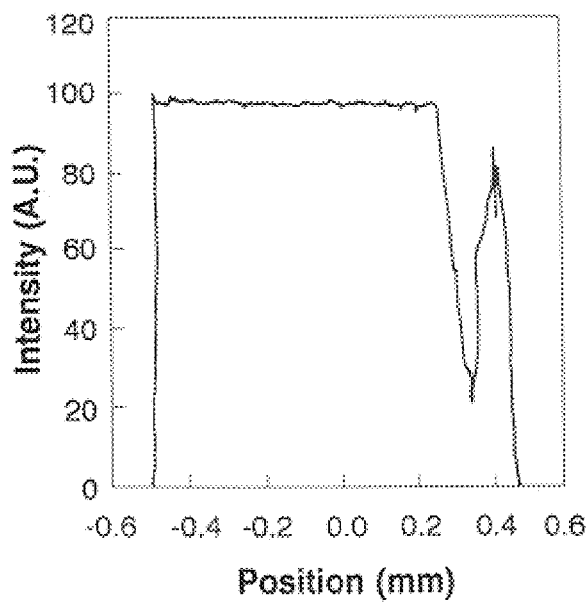
FIG. 8(b)

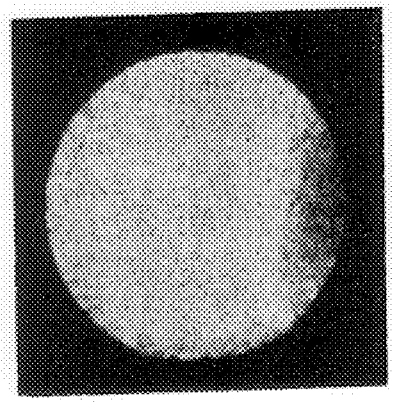
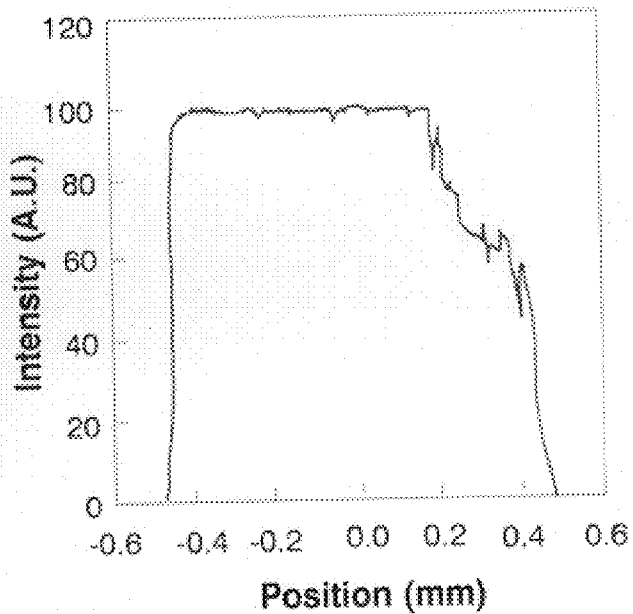
FIG. 8(c)
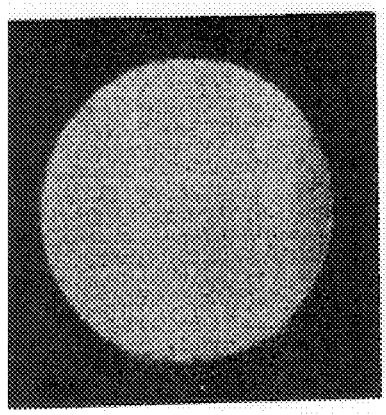
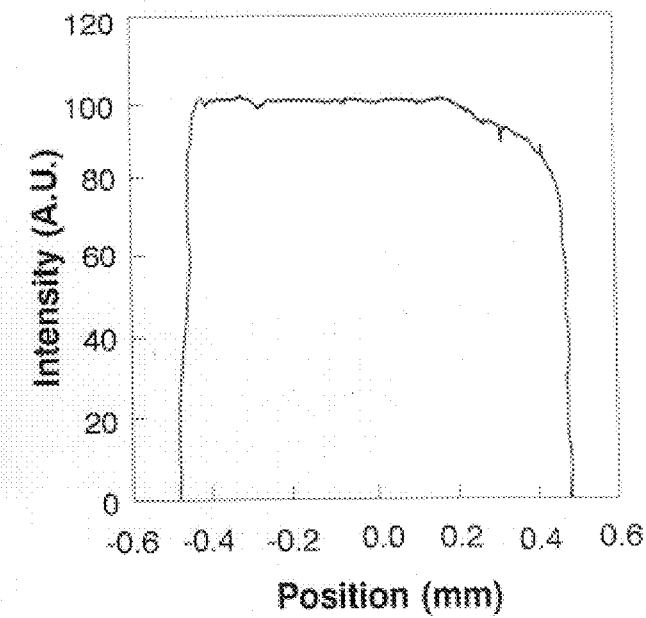
FIG. 8(d)

COST-EFFECTIVE SIDE-COUPLING POLYMER FIBER OPTICS FOR OPTICAL INTERCONNECTIONS

CROSS-REFERENCE TO RELATED APPLICATION

This is a conversion of provisional application Ser. No. 60/061,132, filed Oct. 6, 1997.

BACKGROUND OF THE INVENTION

1. Field of the Invention

This invention relates generally to optical interconnections and more specifically to cost-effective side-coupling interconnections using polymer fiber optics.

2. Discussion of the Prior Art

Market pressure has led optical fiber companies to recognize that polymer optical fibers (POFs) could be a promising cost-effective physical layer networking solution of the future. Recent research and development indicates that some large core (>0.5 mm) POF solutions can deliver Gbit/s optical data over 100 meter distance. See, for example, Y. Koike et al. (1995) "High-bandwidth graded-index polymer optical fiber" *IEEE J. Lightwave Technology* 13: 1475–1489 and S. Yamazaki et al. (1996) "A 2.5 Gb/s 100 m GRIN plastic optical fiber data link at 650 nm wavelength" *Graded Index POF Boston: Information Gatekeepers:* 98–101. Research is also being conducted to identify methods to fabricate low-cost and low-loss POF's for long wavelengths. See, for example, T. Ishgure et al. (1994) "Large-core high-bandwidth polymer optical fiber and its applications" *Technical Digest of CLEO/EUROPE* '94: paper CThD5. The POF technology is expected to provide the following significant cost advantages over its glass optical fiber (GOF) counterparts in many areas from raw material cost to processing and connection costs.

Due to a high melting temperature and rigidity, it is difficult (although possible in principle) to etch structures on glass materials. Research has been performed to etch a single micro-mirror into a conventional GOF. See, for example, D. J. Ripin et al. (1995) "High efficiency side-coupling of light into optical fibers using imbedded v-grooves" *Electron. Lett.* 31: 2204–2205. However, the corresponding low-cost high volume production process is not available. In the past, optical couplers coupling light into or out of a GOF were prefabricated in a controlled environment. Methods of using prisms or blazing gratings attached to fibers, using evanescent waves and using electromagnetic mode coupling concepts are the most popular light coupling approaches.

The coupling mechanism of a sequence of uni-directional, mirror-based side couplers can be modeled using the geometry of FIG. 1(a). Here the two sets of marked parameters are: $\alpha_i$ ($1 \le i \le N$) which are mirror reflective coefficients and $\gamma_i$ which are receiving fiber's transmission coefficients at outputs, both are smaller than or equal to unity. For limited POF length, its absorption and scattering can be omitted. Letting $P_i$ be the output power at the $i^{th}$ port, it can be shown that the receiving power at the N receiving ports are:

$$P_1 = \alpha_1 \gamma_1 P_{in},$$
$$P_2 = (1-\alpha_1)\alpha_2 \gamma_2 P_{in}, \quad (1)$$
$$P_N = (1-\alpha_1)(1-\alpha_2) \ldots (1-\alpha_{N-1})\alpha_N \gamma_N P_{in}.$$

A uniform power distribution to N ports implies that:

$$\frac{\gamma_2 \alpha_2}{\gamma_1} = \frac{\alpha_1}{1-\alpha_1}, \quad (2)$$
$$\ldots$$
$$\frac{\gamma_N \alpha_N}{\gamma_{N-1}} = \frac{\alpha_{N-1}}{1-\alpha_{N-1}}$$

The residue output power $P_{out}$ is defined as $$P_{out} = (1-\alpha_1)(1-\alpha_2) \ldots (1-\alpha_N) P_{in} \quad (3)$$

Using Equation (2), we have $$P_{out} = \frac{\alpha_1 \gamma_1}{\alpha_N \gamma_N}(1-\alpha_N)P_{in} \quad (4)$$

There exist at least two ways to solve for $\alpha$'s and $\gamma$'s. The first case is the constant-$\gamma$ case, which requires $\gamma_1 = \gamma_2 = \ldots = \gamma_N = \gamma \le 1$. The simplest possible situation is that $\gamma=1$, which corresponds to either a perfect coupling or a situation where light is coupled to free-space. The coefficients $\alpha$ can then be evaluated as:

$$\alpha_1 = \frac{P_{in} - P_{out}}{NP_{in}}, \quad (5)$$
$$\alpha_2 = \frac{\alpha_1}{1-\alpha_1},$$
$$\ldots$$
$$\alpha_N = \frac{\alpha_1}{1-(N-1)\alpha_1}.$$

Correspondingly, the power outputs are:

$$P_1 = P_2 = \ldots = P_N = \frac{P_{in} - P_{out}}{N} \quad (6)$$

For example, let $P_{out}=0$, we then have $\alpha_1=1/N$, $\alpha_2=1/(N-1)$, ... $\alpha_{N-1}=\frac{1}{2}$, and $\alpha_N=1$.

The second case is relevant for fiber-to-fiber coupling where receiving coefficients $\gamma$s may not be identical. In this case, by letting $\alpha_1=\alpha_2=\ldots \alpha_N=\alpha$ in a so-called constant $\alpha$ situation, the relation between input and output power is:

$$\alpha = 1 - \left[\frac{P_{out}}{P_{in}}\right]^{1/N} \quad (7)$$

and $$\frac{\gamma_2}{\gamma_1} = \frac{\gamma_3}{\gamma_2} = \ldots = \frac{\gamma_N}{\gamma_{N-1}} = \frac{1}{1-\alpha} \quad (8a)$$

or $$\frac{\gamma_j}{\gamma_i} = \left(\frac{1}{1-\alpha}\right)^{j-i} \quad (8b)$$

where j, like i, is a port index and where j>i to guarantee the validity of equation 8(b). In the most efficient coupling case, let $\gamma_1=1$. We then have:

$$P_1 = P_2 = \ldots = P_N = \left[\frac{P_{out}}{P_{in}}\right]_{(N-1)/N} \left[1 - \frac{(P_{out}\ 1/N)}{P_{in}}\right] P_{in} \qquad (9)$$

Although the balanced power is reached, this scheme requires a non-zero $P_{out}/P_{in}$ and thereby leads to inefficient usage of power. For example, for a pre-determined ratio $P_{out}/P_{in}$, Equation (7) first yields an $\alpha$ value. Using Equation (8), $\gamma$ values can then be determined as $\gamma_i = (1-\alpha)^{N-i}$, for $1 \leq i \leq N$. The most general case is when neither $\alpha$ nor $\gamma$ is a constant. Equations (1) and (2) have to be used to calculate for each coupler. Since there are 2N constants to be decided, a general procedure is for a required $P_N$, first determine all $0 \leq \alpha_i \leq 1$ ($1 \leq i \leq N$) and $\gamma N$ using the last equation in Equation(1). Corresponding to the set of N+1 constants, the remaining $\gamma_i (1 \leq i \leq N-1)$ can be calculated using Equation (2). As a numerical example, letting $P_{out}=0.1\ P_{in}$ and N=16, we have calculated both constant-$\alpha$ and constant-$\gamma$ cases and plotted the parameters $\alpha$, $\gamma$, $\eta = P_i/P_{in}$ in FIG. 1(b) where $\eta$ is defined as the power ratio between the ith port and the input. Squares and triangles denote the curves for constant $\alpha$ and constant $\gamma$, respectively. It can be seen that since $\gamma$ could be as large as unity, the overall coupling efficiency for the constant-$\gamma$ case is, in general, larger than that of the constant-$\alpha$ case.

Couplings between POF & Free-space: One simple but useful application of using micro-mirrors along a POF is to deliver equal intensity optical signals to N different locations along a fiber. Previous methods of delivering optical signals were reported using either holograms, stacked birefringent crystals and integrated optical wave-guides. See, for example, J. W. Goodman et al. (1980) "Optical interconnections for VLSI systems" *Proc. IEEE* 72: 850–858; R. T. Chen et al. (1992) "Guided-wave planar optical interconnects using highly multiplexed polymer waveguide holograms" *J. Lightwave Tech.* 10: 888–897; J. Jahns (1994) "Diffractive optical elements for optical computers" *Optical Computing Hardware,* eds. J. Jahns and S. H. Lee, New York: Academic Press: 137–167; and T. W. Stone et al. (1994) "Optical array generation and Interconnection using birefringent slabs" *Appl. Opt.* 33: 182–191. The availability of a POF splitter can provide a flexible yet low-cost method and apparatus for delivering optical signals to receiving terminals with flexible spacings than the above mentioned situations. See, for example, Y. Li et al. (1996) "4×16 polymer optical fiber array couplers" *IEEE Photon. Tech. Lett.* 8: 1650–1652.

SUMMARY OF THE INVENTION

It is, therefore, an object of the present invention to provide a low cost optical fiber coupler apparatus and method for fabrication thereof.

It is another object of the present invention to provide a flexible optical fiber coupler apparatus and method for fabrication thereof.

It is yet another object of the present invention to provide an optical fiber coupler apparatus and method for fabrication thereof in which the highly flexible mechanical processing capability of POFs are utilized.

The availability of POFs makes it possible to incorporate, in addition to the above mentioned coupling approaches, a scheme to use simple optical reflection for couplings. See, for example, U.S. Pat. No. 4,872,739, to Kahn et al.; B. P. Keyworth et al. (1995) "Distributed serial taps in dispensed polymer multimode waveguides" 1995 OSA Annual Meeting, Sep. 10–15, 1995 (Portland, Oreg.) talk WVV52; U.S. Pat. No. 5,432,876, to Appeldorn et al.; Y. S. Liu et. al. (1996) "Polymer optical interconnect technology (POINT): optoelectronic packaging and interconnect for board and backplane applications" Optoelectronic Interconnects and Packaging (eds. R. T. Chen and P. S. Guilfoyle) SPIE CR62: 405–414; allowed U.S. patent application Ser. No. 08/ADD SERIAL NO., to Li et al. entitled "Optical Fiber Taps"; and Y. Li et al. (1996) "Distribution of light and optical signals using embedded mirrors inside polymer optical fibers" *IEEE Photo. Tech. Lett.* 8: 1352–1354. Both the conventional reflection and the total internal reflection can easily be implemented through mirrors formed inside a POF core using mechanical or other types of low-cost, in-print etching techniques. Using a polished knife, a relatively smooth surface can be etched in different shapes and angles on a POF. A mirror can be formed either by satisfying the total internal reflection condition of the etched interface or by metal deposition using a conventional metallic mirror coating process. In the later case, after a mirror is formed, it is possible to re-deposit the polymer to embed the cut so that the mirror is physically inside the POF. One obvious advantage of using such mirrors to couple light into or out of a fiber is that it offers a wide range of flexible coupling directions in three-dimensional (3D) space.

Accordingly, a first embodiment of the optical couplers of the present invention is provided wherein the optical fiber coupler is configured to be unidirectional. The unidirectional coupler comprises at least two input polymer optical fibers, each having a central axis for transmission of an input optical signal therealong and at least two output polymer optical fibers, each also having a central axis for transmission of an output optical signal therealong. The output optical fibers are positioned substantially perpendicular to the input optical fibers forming a grid of optical fibers. Also provided is a body in which the input and output optical fibers are housed, with each input optical fiber being in optical communication with each output optical fiber at each point where the input and output optical fibers cross. An input mirror is formed within each input optical fiber and positioned at each point of crossing for reflecting inputted optical signals substantially perpendicular to their axial direction and into its corresponding output optical fiber. Each input mirror comprises a notch having at least one surface angled with respect to the central axis of the optical fiber for reflecting an optical signal perpendicular to its central axis. Similarly, an output mirror is formed within each output optical fiber and positioned at each point of crossing for reflecting the perpendicular optical signal from its corresponding input optical fiber to a direction along its central axis. Each output mirror comprises a notch having at least one surface angled with respect to the central axis of the optical fiber for reflecting the perpendicular optical signal from its corresponding input optical fiber parallel to its central axis. The apparatus provides for coupling of the input optical signals with any combination of the input optical fibers and transmitted into any combination of the output optical fibers.

A second embodiment is also provided which is configured as a bidirectional optical fiber coupler. The bidirectional coupler comprises a first polymer optical fiber having a central axis for transmission of optical signals therealong and at least two tapping polymer optical fibers, each having a central axis for transmission of an optical signal thereal ong. The tapping optical fibers are positioned substantially perpendicular to the input optical fibers and each terminate at the first optical fiber at a side coupling. Also provided is are bidirectional mirrors formed within the first optical fiber and positioned at each side coupling for reflecting optical signals from the tapping optical fiber substantially perpendicular to its axial direction and into the first optical fiber. Each mirror is centered along the central axis of its corresponding tapping fiber and comprises a notch having two surfaces angled with respect to the central axis of the first optical fiber for reflecting an optical signal perpendicular to its central axis. The configuration of the second embodiment allows optical signals from the tapping fibers to be reflected in opposite directions along the first optical fiber.

Another aspect of the present invention is an apparatus and method for fabricating the inventive couplers disclosed herein.

BRIEF DESCRIPTION OF THE DRAWINGS

These and other features, aspects, and advantages of the apparatus and methods of the present invention will become better understood with regard to the following description, appended claims, and accompanying drawings wherein:

FIG. 5 illustrates a multiplication table summarizing the resulting products of coupling coefficients for arbitrary pairs of input-output couplings in a 4-port, uniform optical bidirectional coupler, the shaded areas being the forbidden areas, with $\beta = 1 - \alpha$;

FIG. 8(a) illustrates an image and corresponding cross-sectional intensity plot of light distributions at a 1 mm diameter POF cross-section which is located 1 mm away from an embedded micro mirror of a depth of 1/10 of the fiber diameter;

FIG. 8(b) illustrates an image and corresponding cross-sectional intensity plot of light distributions at a 1 mm diameter POF cross-section which is located 2 mm away from an embedded micro mirror of a depth of 1/10 of the fiber diameter;

FIG. 8(c) illustrates an image and corresponding cross-sectional intensity plot of light distributions at a 1 mm diameter POF cross-section which is located 3 mm away from an embedded micro mirror of a depth of 1/10 of the fiber diameter;

FIG. 8(d) illustrates an image and corresponding cross-sectional intensity plot of light distributions at a 1 mm diameter POF cross-section which is located 4 mm away from an embedded micro mirror of a depth of 1/10 of the fiber diameter;

DETAILED DESCRIPTION OF THE PREFERRED EMBODIMENTS OF THE INVENTION

Figure 1A:
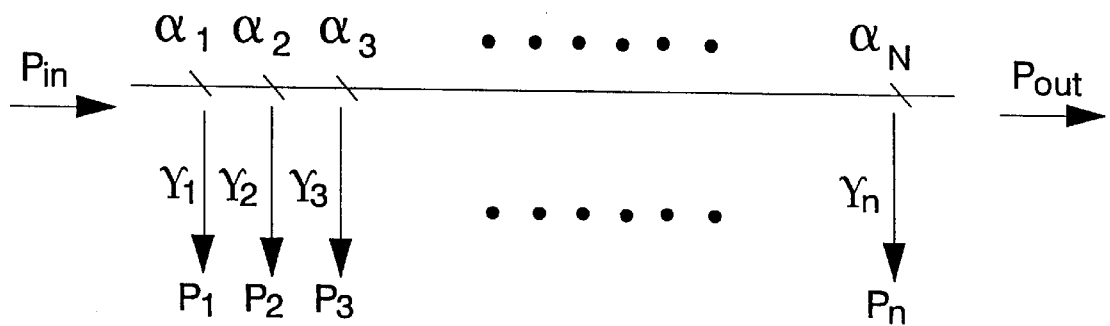
FIG. 1(a) illustrates a model of POF side coupling. P, light power; $\alpha$, micro mirror's reflectance; $\gamma$, receiving fiber's transmission coefficients.
Figure 1B:
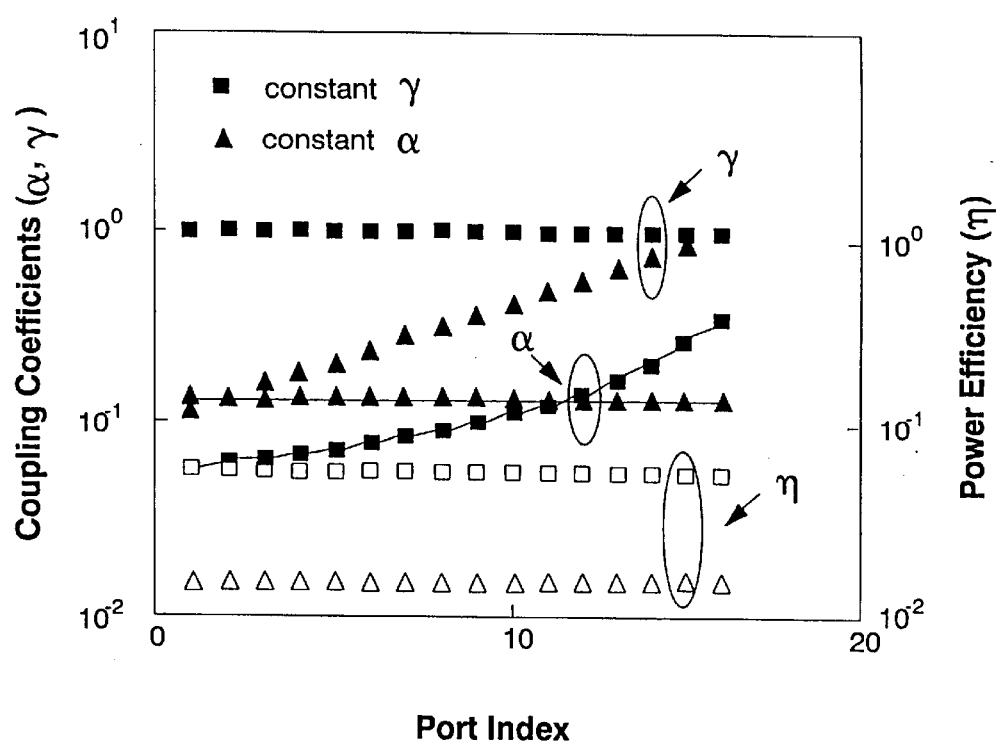
FIG. 1(b) illustrates coefficients for unidirectional couplings for an N=16 case. $\eta = \alpha\gamma$.
Figure 2A:
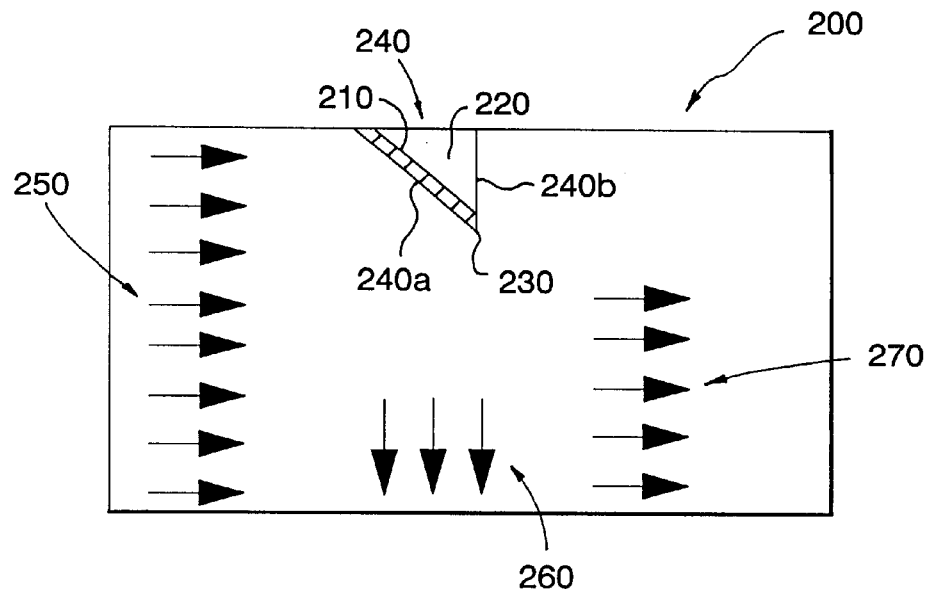
FIG. 2(a) illustrates a section of POF showing a 45° total internal reflective mirror.

Referring now to FIG.2, a section of a micro-mirror embedded polymer fiber 200 is illustrated. FIG. 2(a) indicates that such fiber 200 can be formed with a total internal reflection mirror 210 by cutting the fiber 200 so that the mirror 210 is formed between the polymer and air. The mirror 210 is accomplished by cutting a notch 240 in the fiber 200 having at least one surface 240a which is angled relative to the path of light through the fiber 200 for reflecting an input optical signal 250 perpendicular to its central axis. The reflected signal 260, as shown in FIG. 2(a), travels perpendicular to the input optical signal 250 while the unreflected portion 270 of the input optical signal 250 continues to travel unimpeded by the mirror 210.

Preferably, the angled surface 240a is at an angle of 45° relative to the path of light through the fiber. In the embodiment shown in FIG. 2(a) the other surface 240b of the notch 240 is perpendicular to the path of light through the fiber 200. However, it should be understood that the notch surfaces 240a, 240b can be angled at various angles with respect to the fiber's central axis without departing from the scope and spirit of the present invention.

Figure 2B:
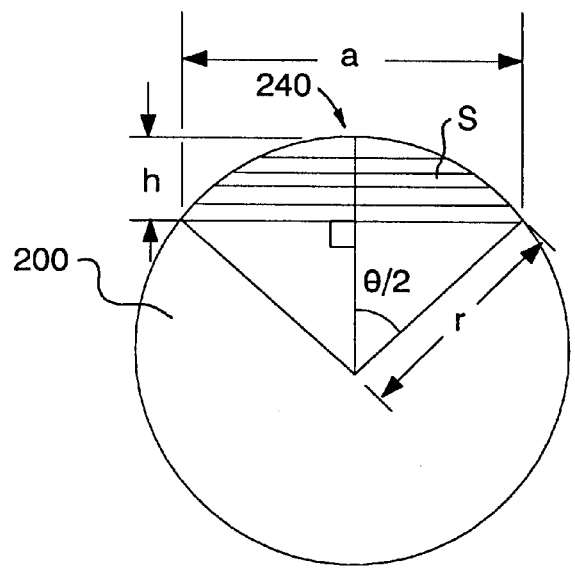
FIG. 2(b) illustrates cross-section geometry and parameters of the POF micro-mirror with the shaded area being the projected area of the mirror.

Optionally, a metal coating 230 can be deposited on the angled surface 240a of the mirror 210 for enhancing the reflectivity of the mirror 210. Preferably the metal coating 230 is vapor deposited using any method known in the art. Suitable materials for the metal coating 230, by way of example only, include silver, nickel gold or aluminum. Furthermore, polymer 220 can be optionally added to fill in the notch 240 after deposition of the metal layer 230. In FIG. 2(b), a cross-section geometry of the fiber core 200 is shown where the area of the simple mirror is shaded and is denoted as S. Where variables a, r, and θ are geometric parameters used to calculate the ratio of the shaded area versus the total cross-section area of the fiber using general geometric principles known in the art. The area of the 45° mirror is related to the projected depth h of the cut, which can easily be monitored during fabrication. Using the parameters defined in FIG. 2(b), it can be shown that when the numerical aperture NA of the fiber is fully used, the mirror coupling coefficient a can be obtained as:

$$\alpha = \frac{\cos^{-1}(1-\beta)}{\pi} - \frac{1}{\pi}\sqrt{\beta(2-\beta)(1-\beta)^2} \quad \text{for } 0 \leq \beta < 1 \quad (10a)$$

and $$\alpha = \frac{\cos^{-1}(\beta-1)}{\pi} + \frac{1}{\pi}\sqrt{\beta(2-\beta)(1-\beta)^2} \quad \text{for } 1 \leq \beta \leq 2 \quad (10b)$$

where β=h/r or the ratio of the depth of the cut versus the radius of the fiber. For coupling between a fiber and free-space, γ=1 can be assumed. To generate uniformly distributed outputs, Equation (12) can be used to determine the projected depths of all N mirror cuts along a POF.

Data communication and interconnection applications may require that both the transmitting ports and receiving ports be connected to fibers. As an extension of the 1-to-N and fiber-to-free-space coupling, some fiber-to-fiber POF array coupling concepts are investigated. When fiber-to-fiber connection is used, the assumption of γ=1 is no longer valid. We have previously proposed a 4×16 beam-splitting device where power from each of the 4 input fibers is uniformly split into 4 output fibers. For applications demanding uniform beam-splitting, a constant-γ situation can still be applied. What is more challenging than the fiber-to-free-space situation is to manage both α and γ so that the finally received power at different outputs are identical. The modeling of coupling loss as a function of misplacement together with experimental measurements were reported. See, for example, A. W. Lohmann "Optical bus networks" *Optik* 74: 30–35.

Figure 3A:
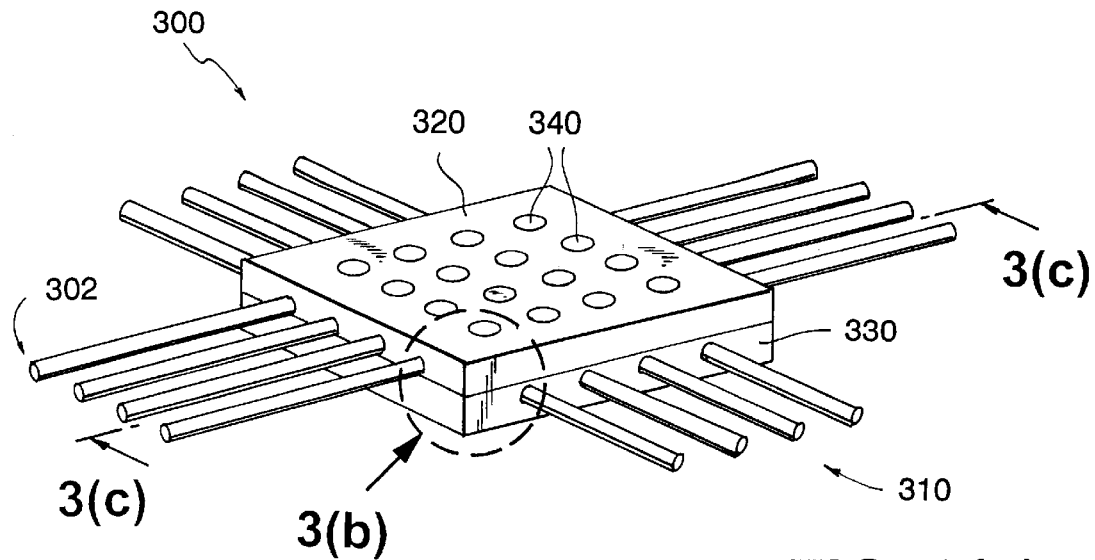
FIG. 3(a) illustrates an all polymer 4×4 cross-connector with access holes placed on both the top and bottom holding plates for the convenience of mirror cutting.
Figure 3B:
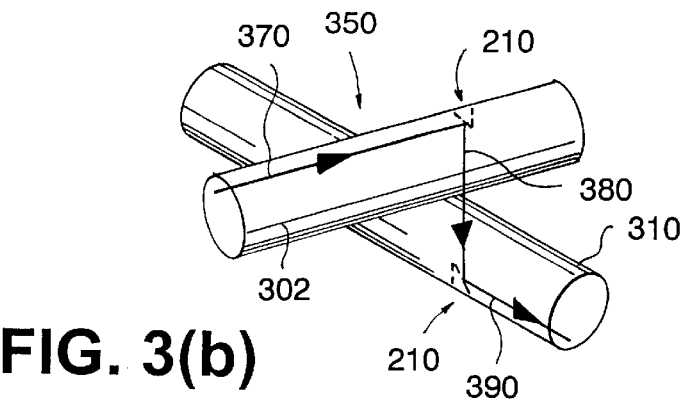
FIG. 3(b) illustrates an enlarged view of one of the cross-connections of FIG. 3(a)

In addition to the side-to-end type fiber-to-fiber couplings, it is also possible to explore side-to-side fiber couplings using POFs. A schematic diagram of a 4×4 POF cross-connector 300 is shown in FIGS. 3a and 3b for purposes of illustration, however, it is understood by someone in the art that any number greater than two input and output fibers can be utilized without departing from the spirit and scope of the invention. The cross-connector 300 features the so-called write-once-read-many times (WORM) capability, implying that its connection pattern can be programmed once. Here, light can be coupled from any combination of the four input POFs 302 into any combination of the four output POFs 310 using a set of two side-coupling mirrors 210 at each of the sixteen crossing points, one of which is illustrated in FIG. 3(b).

Referring now to FIG. 3(a) a unidirectional optical fiber coupler 300 is illustrated having a 4×4 grid of input and output polymer optical fibers 302, 310. However, grids of 2×2 and larger can be employed without departing from the scope and spirit of the invention. The input polymer optical fibers 302 each have a central axis for transmission of an input optical signal therealong. Likewise, the output polymer optical fibers 310 each have a central axis for transmission of an output optical signal therealong. The output optical fibers 310 are positioned substantially perpendicular to the input optical fibers forming a grid of optical fibers in which each of the input optical fibers 302 crosses each of the output optical fibers 310 at crossing points 350, one of which is illustrated in FIG. 3(b).

Figure 3C:
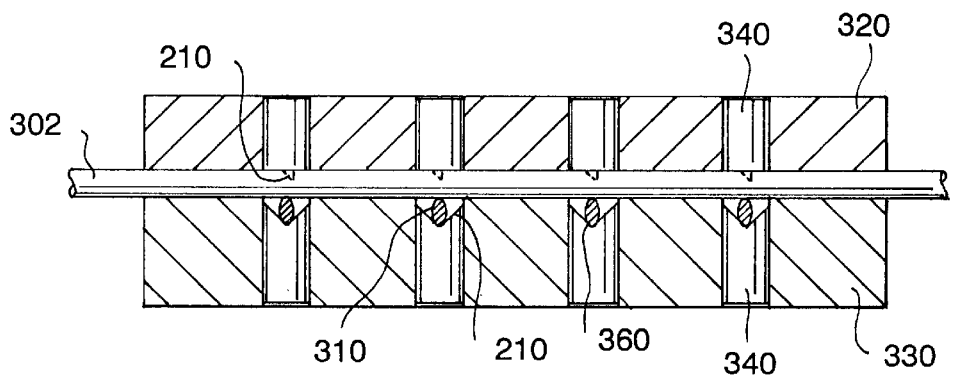
FIG. 3(c) illustrates a sectional view of the 4×4 cross-connector shown in FIG. 3(a) taken along line 3(c)—3(c)

Referring back to FIG. 3(a), the unidirectional optical fiber coupler 300 also comprises a body in which the input and output optical fibers are housed. The body preferably comprises an upper and lower half 320, 330 fastened together by any fastening means known in the art, such as with screws (not shown) located at the four corners of the upper and lower halves 320, 330. The input optical fibers 302 are positioned in the body such that each of them are in optical communication with each output optical fiber 310 at each point where the input and output optical fibers cross 350. Preferably, the upper and lower halves 320, 330 are fabricated from a polymer and have v-grooves 360, shown in FIG. 3(c), running parallel to the optical fibers 302, 310 in which the optical fibers 302, 310 are disposed for locating the optical fibers 302, 310 in their respective positions within the grid.

Referring now to FIG. 3(b), input mirrors 210, of the type previously described with reference to FIGS. 2(a) and 2(b), are formed within each input optical fiber 302 and positioned at each point of crossing 350 for reflecting an input optical signal 370 substantially perpendicular to their axial direction 380 and into its corresponding output optical fiber 310. Output mirrors 210, also of the type previously described with reference to FIGS. 2(a) and 2(b), are formed within each output optical fiber 310 and positioned at each point of crossing 350 for reflecting the perpendicular optical signal 380 from its corresponding input optical fiber 302 to a direction along its central axis 390. From this arrangement it can clearly be seen that any of the input optical signals 370 can be coupled from any combination of the input optical fibers 302 and transmitted into any combination of the output optical fibers 310 via the reflected optical signal 380.

To make real-time cutting possible, the upper and lower halves 320, 330 to hold the input and output POFs 302, 310 use sixteen access holes 340 so that a thin cutting knife (not shown) can be inserted from the outside of the sandwiched halves 320, 330 at each crossing.

Another possible fiber-to-fiber coupling situation is a bidirectional coupling. Such a two-way coupling has applications in data communications using bus concepts. Instead of forming a unidirectional fiber ring, a bidirectional coupling allows coupled tapping ports along a linear section of a first or bus fiber to share inputs and outputs in time-division or wavelength-division multiplexing. Such a bidirectional POF data bus 400 is shown schematically in FIG. 4(a). GOF-based data bus has long been proposed where input-output couplings are implemented through a set of bulky directional couplers. Several other attempts to implement free-space optical buses using beam-splitters, holograms or planar waveguides have also been reported. See, for example, A. W. Lohmann et al. (1986) and C. Zhao et al. "General purpose bidirectional optical backplane:

high-performance bus for multiprocessor systems" *Proc. MPPOI '95 New York: IEEE Comput. Soc.*: 188–195.

A usual requirement of a bus is that for an identical input power launched into the bus at each input port, an identical receiving power is expected at each output. Using side-coupling POFs, a bidirectional optical bus can also be implemented.

Figure 4A:
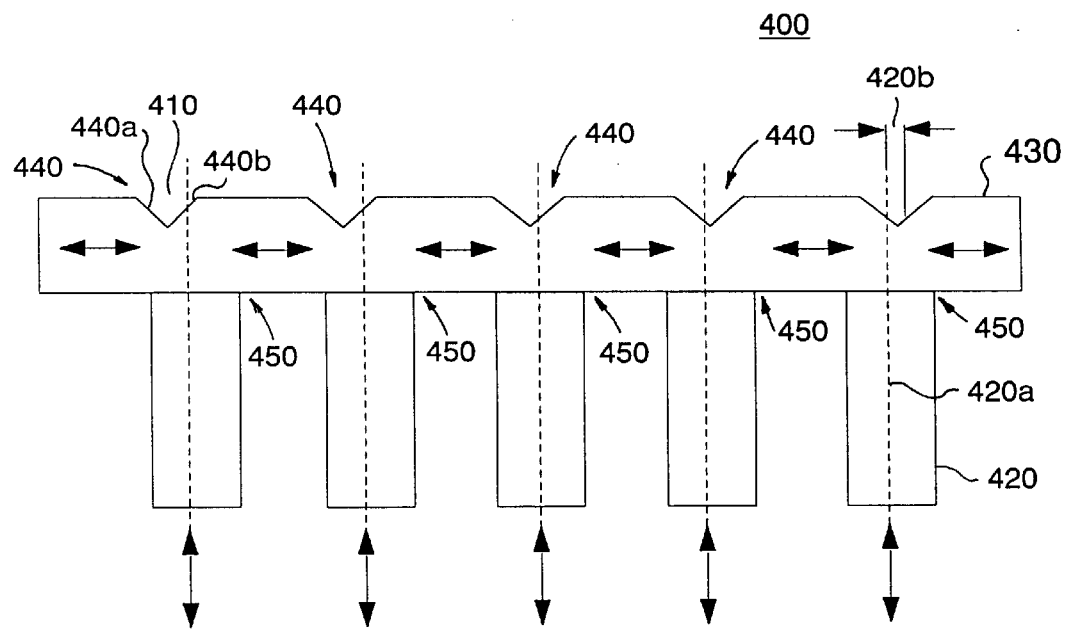
FIG. 4(a) illustrates a schematic of a POF bi-directional coupler having a receiving fiber axially shifted with respect to the transmitting fiber to create two different coupling ratios at each port.

Referring now in detail to FIG. 4(a), a bidirectional optical fiber coupler 400 is illustrated. The bidirectional optical fiber coupler 400 comprises a first or bus polymer optical fiber 430 having a central axis for transmission of optical signals therealong. Also provided are at least two tapping polymer optical fibers 420, each having a central axis for transmission of an optical signal therealong. The tapping optical fibers 420 are positioned substantially perpendicular to the input optical fibers and each terminating at the first optical fiber 430 at a side coupling 450.

Bidirectional mirrors 440, similar to that previously illustrated in FIGS. 2(a) and 2(b) with the exception that the notch comprises two angled surfaces 440a, 440b are formed within the first optical fiber 430 and positioned at each side coupling 450 for reflecting optical signals from the tapping optical fibers 420 substantially perpendicular to its axial direction and into the first optical fiber 430. Each mirror 440 is substantially centered along the central axis 420a of its corresponding tapping fiber 420 and comprises a notch 410 having two surfaces 440a, 440b angled with respect to the central axis of the first optical fiber 430 for reflecting an optical signal perpendicular to its central axis. Thus, the notches 440 are cut into the first, or bus, fiber 430 at each coupling to create mirrors 410 which serve to reflect light from the tapping fiber 420 to two opposite directions along the bus fiber 430.

To achieve tapping uniformity, the axial alignment of the tapping fibers 420 are preferably deliberately shifted in a way to achieve an asymmetric coupling ratio for the two opposite directional couplings. The actual amount of shift depends on the number of bus ports and its port index. As clearly shown in FIG. 4(a), the mirrors 440 are shifted 420b relative to the central axis 420a of their corresponding tapping optical fibers 420 such that similar output power levels are achieved for each of the optical signals reflected in opposite directions regardless of the distance each of the two opposite signals must travel to their respective outputs.

Figure 4B:
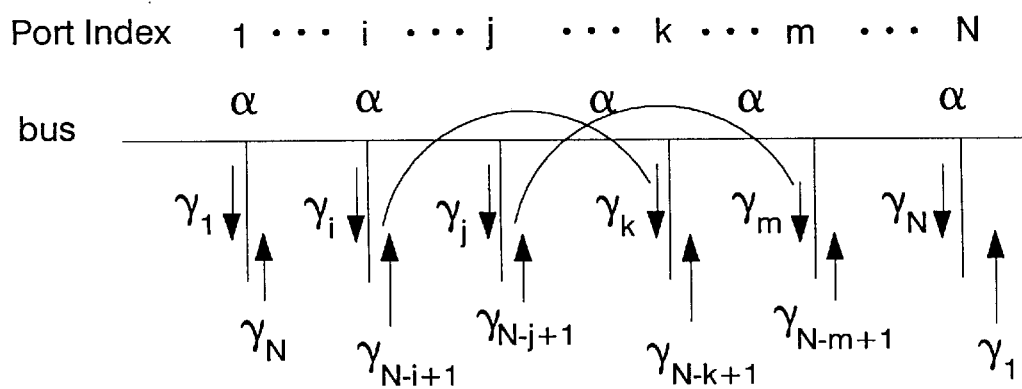
FIG. 4(b) illustrates a model of bidirectional coupling incorporating two identical unidirectional couplers placed symmetrically in opposite directions.

In order to demonstrate the validity of the proposed scheme, a composite schematic of the bidirectional coupling 400 is shown in FIG. 4(b). Two sets of unidirectional equal output couplers are placed in opposite directions in a symmetric way. To simplify our proof, the constant-$\alpha$ coupling is assumed. Four arbitrary ports which will be used for our proof are indexed as i, j, k and m, as shown. Since each port is subdivided into two ports coupling the input beam to either the left or right direction, the $\gamma$ for a port, i.e., the $i^{th}$ port, should have two distinct values: $\gamma_{N-i+1}$ for coupling to the right-hand side and $\gamma_i$ for coupling to the left-hand side. Note that because of using the symmetric placement, the coupling efficiency of the right-hand side coupling at the $i^{th}$ port equals that of the left-hand side coupling of the $N_{-i}+1^{th}$ port.

In order to prove that regardless of the port index, for an equal among of light sending into the system via a particular port, an identical power can be expected at each output port along the bidirectional bus, we prove that for two arbitrary input-output pairs: $i^{th}$ input to $k^{th}$ output, and $j^{th}$ input to $m^{th}$ output, respectively, their output power levels are identical for a given input power.

Let j=i+a, k=i+b and m=i+c, this identical output situation implies the following equation:

$$\gamma_{N-i+1}\alpha(1-\alpha)^{b-1}\alpha\gamma K = \gamma_{N-j+1}\alpha(1-\alpha)^{m-j}\alpha\gamma_m \quad (11)$$

We assume that the above equation holds and derive the condition it must satisfy. By substituting the indices, Equation (11) becomes:

$$\frac{1}{(1-\alpha)^{b-c+a}} = \frac{\gamma_{i+b}}{\gamma_{i+c}} \frac{\gamma_{N-i+1}}{\gamma_{N-i+1-a}} \quad (12)$$

it should not be difficult to realize that the condition of Equation (12) is satisfied by Equation (8b). Thus, arbitrary pairs of input-output coupling yield identical output power in this symmetrically distributed bi-directional coupling system. Take a 4-port system as an example. Assume that $\alpha=0.3$, $\beta=1-\alpha=0.7$. Using Equation (8a), we have $\gamma_1=1$, $\gamma_2=0.7$, $\gamma_3=0.49$ and $\gamma_4=0.343$, respectively. Using the multiplication table shown in FIG. 5, we can show that from any allowed input-output pair, a constant efficiency of 4.41% is produced.

EXAMPLES

To confirm many of the proposed POF side-coupling device concepts, various experiments were performed and some prototype devices were fabricated as illustrated in the following examples.

Example 1

Fiber-to-free-space Couplings

Experiments were performed to form micro-mirrors along polymethyl Methacrylate (PMMA) fibers (Model TB-1000) obtained from Asahi Chemical, Ltd. The diameter of the fiber core is 1,000 $\mu$m and the core material has a refractive index of n=1.494 at the wavelength $\lambda$=650 nm. The fiber was designed primarily for lighting and short distance data transmission applications and has a high numerical aperture of NA=0.485 and an attenuation of 1.25 dB/m at $\lambda$=650 nm.

Figure 6:
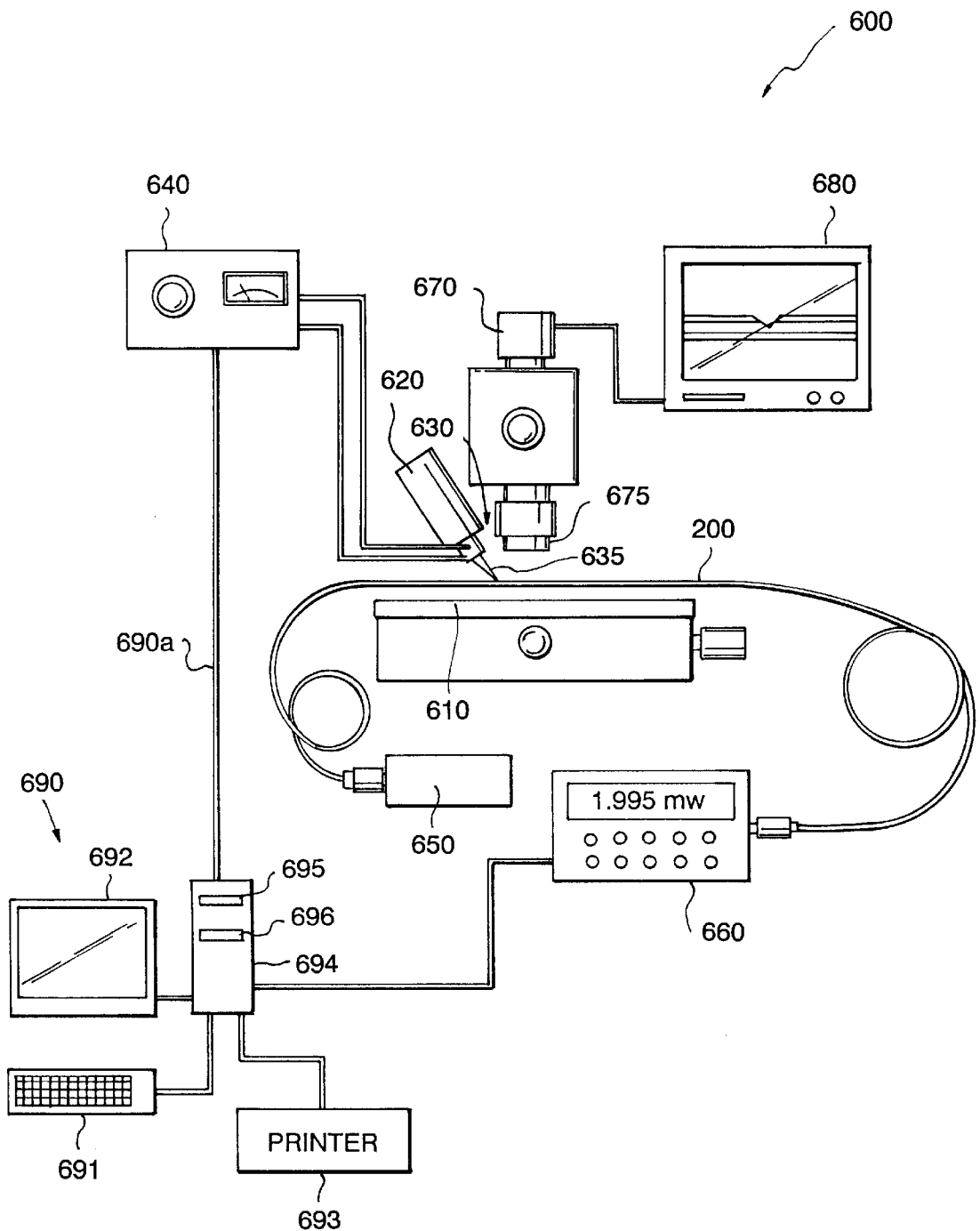
FIG. 6 illustrates a mirror-cutting system for fabricating POF side-couplers.
Figure 7A:
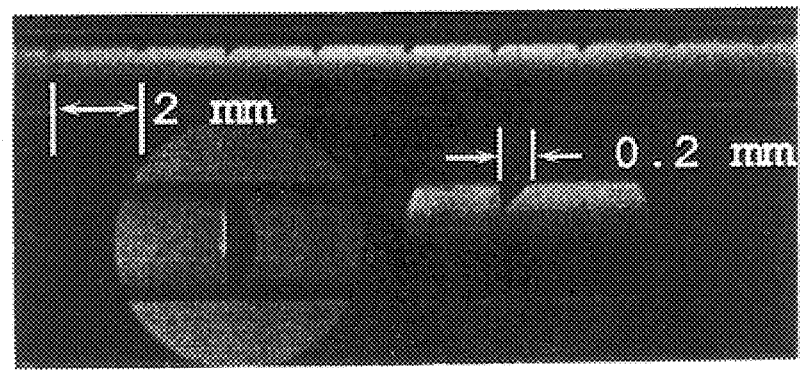
FIG. 7(a) illustrates a photograph of a POF with a sequence of eight embedded micro mirrors.

To ensure the quality of cutting, a cutting system, generally referred to by reference numeral 600 and shown in FIG. 6 was devised. The cutting system 600 contains a micrometer controlled X-Y translational stage 610 and a micrometer controlled rotational and translational knife mount 620 affixed thereto. A knife 630 used for cutting the notch in the fiber 200 has a polished flat surgical blade 635 and is preferably connected to a thermal electric heater and controller 640 so that cutting temperature can be selected. Although the PMMA material is sufficiently soft to be cut at room temperature, our experiment shows that a combination of using pressure and temperature ranging from 85° to 95° F. can result in a smoothly finished surface (see FIG. 7(a) for the profile of a typical cut). In our experiment, the finished surface roughness is typically between 15–50 $\mu$m.

During the cutting process, an input end of the fiber 200 to be cut is connected to a light source, preferably a power stabilized 5 mW $\lambda$=650 nm InGaP/InGaAlP Semiconductor multiple-quantum-well laser 650, preferably a Toshiba TOLD 9421). The output end of the fiber is connected to an optical power meter 660, preferably digital, which has a 4 digit measuring precision. The optical power meter 660 measures residue optical power at the output end of the fiber. Where the residue optical power is the difference between the input power and the intensity output of the mirror.

Owing to serial processing, the intensity output of each mirror can be controlled through on-line monitoring of residue power at fiber output end. This is accomplished with a processor 690 for generating a feedback signal 690a to the stage based upon the residue optical power signal. With this arrangement, the stage directs the knife to cut the notch to a depth until the residue power and thus the mirror intensity output reaches a predetermined limit. The processor is preferably a personal computer having an input device such as a keyboard 691, an output device, such as a monitor 692 and printer 693, a central processor (CPU) 694, such as a pentium II running at 233 MHZ, and a memory means, such as a 3.2 GB hard drive 695 and 1.44 MB floppy drive 696.

Optionally, the cutting can also be performed under direct vision by adding a CCD camera 670 with an attached microscope for magnifying and projecting the cutting process in real-time onto a monitor 680 for visual supervision of the cutting process.

Figure 7B:
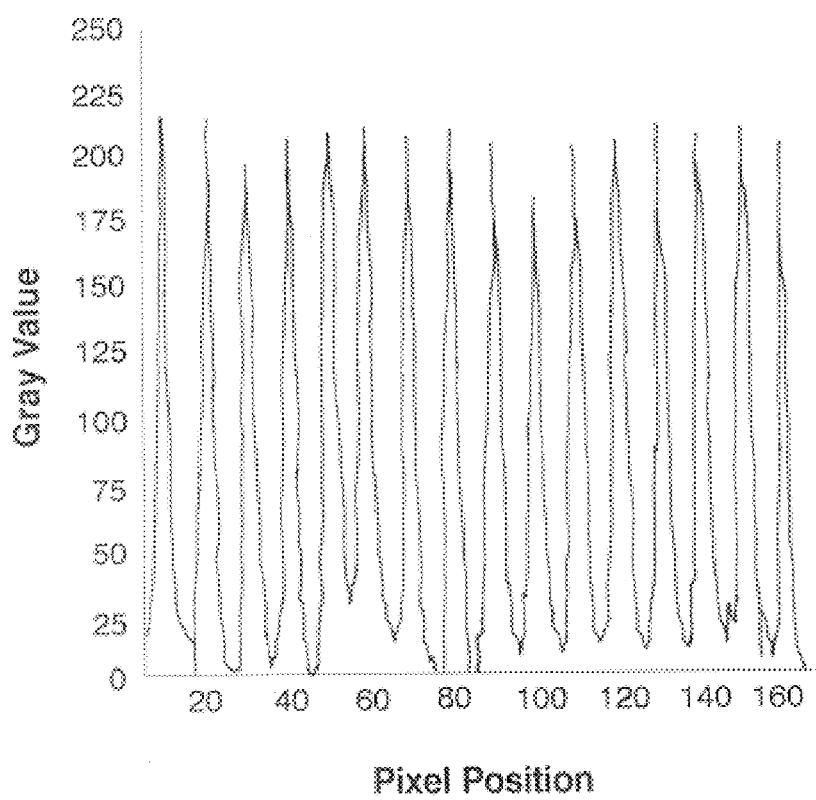
FIG. 7(b) illustrates an intensity profile of a typical sequence of sixteen mirror outputs along a section of side-coupling POF.
Figure 9:
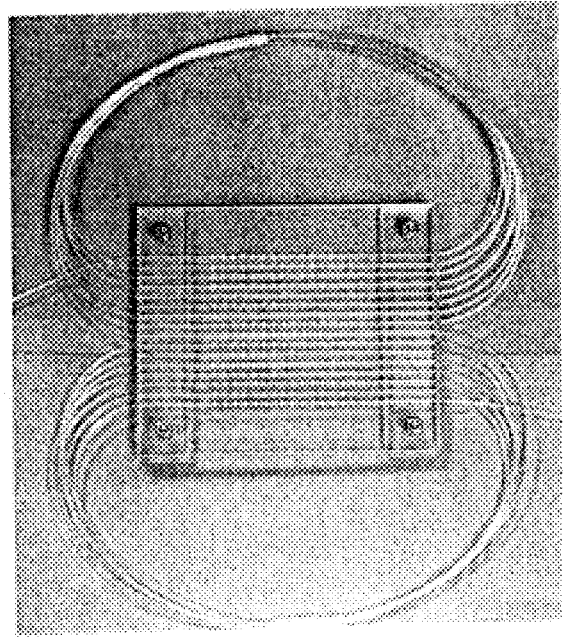
FIG. 9 illustrates a photograph of an POF illuminating back-plane with an array of 16×16 side-coupling mirrors formed on a single POF.

FIG. 7($b$) depicts a typical intensity profile of a series of 16 mirrors embedded along a 20 mm section of the PMMA fiber which was cut using the on-line monitoring method just described. For this simple case, there was no metallic coating on the mirror surface. The coupling scheme is based on total internal reflection at the polymer and air interface. A good contrast ratio of better than 15:1 was observed. If instead of monitoring the residue light power at the fiber end, the output light power at individual mirrors can be directly monitored during the cuttings, we are confident that less than 15% intensity fluctuation is obtainable. Using this on-line residue power monitoring method, PMMA fibers with as many as 400 side-emitting output ports have been made with overall, port-by-port intensity fluctuations under 26%. Since for this fiber, the spacing between outputs was 2.0 mm, or in other words, the entire 400 port fiber has a length of 0.8 m, the absorption based attenuation was not as important as for the situations where light needs to be distributed to a range of longer distance.

The above-described mirror formation method can also be modified to allow pre-specified or parallel cuttings without intensity feed-back. Multiple knives with their cutting angles and depths predetermined can be used simultaneously to speed up the entire fabrication procedure. However, without using the on-line monitoring process, depths of cuts must be precisely predetermined. Results shown in Equation (10) are valid only when the condition of cross-sectional uniform light distribution at any given cutting position is satisfied. When cuts are closely spaced, shadow effect may inhibit light uniformity. For this reason, we experimentally studied the shadowing effect and its relation to the minimum spacing between two consecutive cuts. A 1 mm diameter POF was embedded with a single micro mirror whose depth of cut was 1/10 of the fiber diameter. A microscope was used to image the end surface of the fiber to monitor the resulting intensity profile. The spacing between the polished end surface and the mirror location varied from 10 mm, 4 mm, 3 mm, 2 mm to 1 mm. In all cases, the input illumination condition was kept constant. For a large spacing of 10 mm, no shadowing effect was observed. When the spacing was reduced to 4 mm, a small and smooth shadow began to appear. The shorter the spacing, the larger the shadow (see FIGS. 8$a$–$d$). Additional experiments also confirmed that the smaller the relative cutting depth, the smaller the minimum spacing at which the shadow starts appearing. Initial experiments indicate that spacing needs to be kept about 40–50 times the depth of a cut in order to substantially reduce the shadowing effect.

Figure 11:
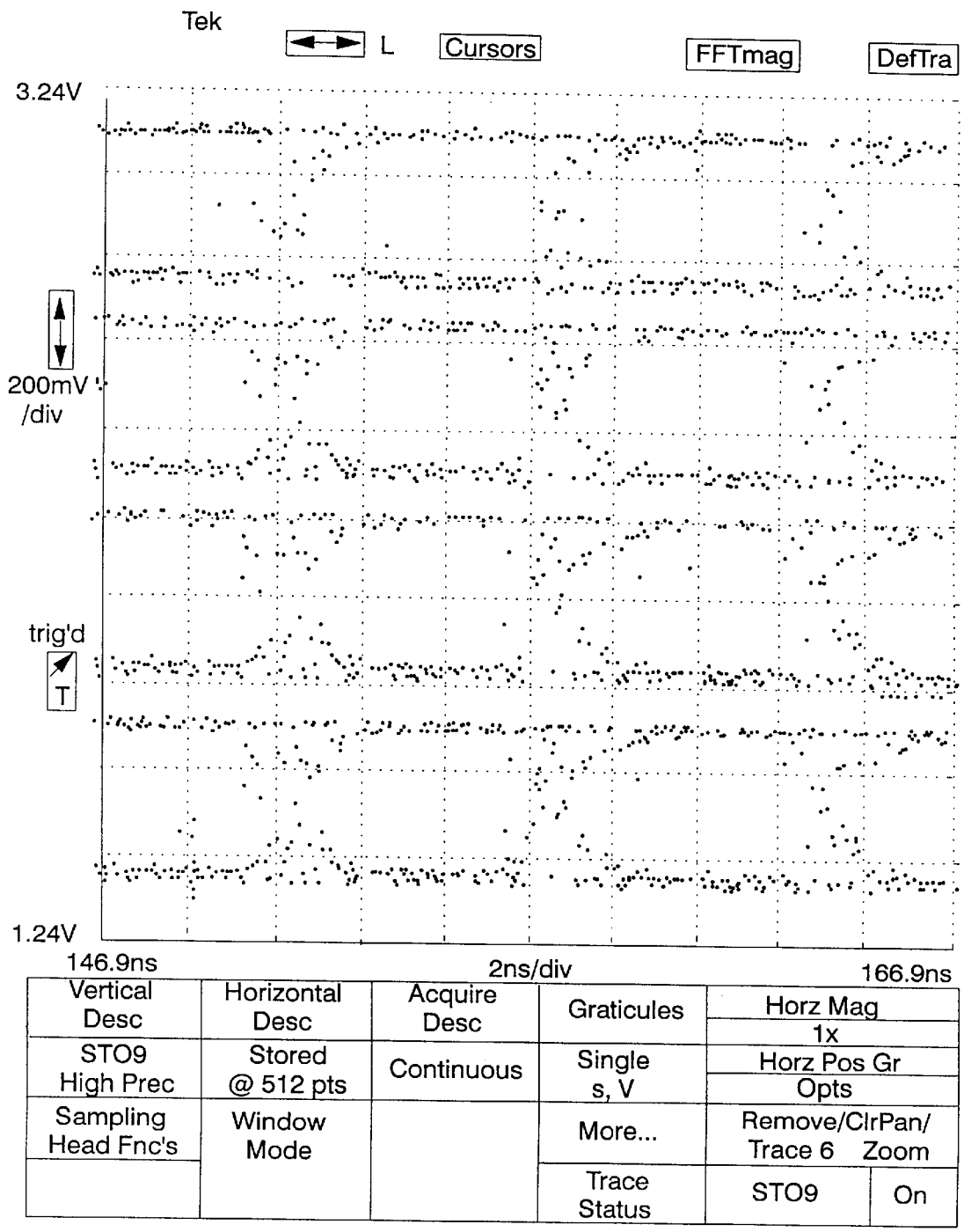
FIG. 11 illustrates a set of four typical eye diagrams (155 Mb/s) of 1-to-4 splitting results of the coupler shown in FIG. 10, the 15% power fluctuations among the four channels being invisible at receiver outputs.

The following experiment was performed for embedding mirrors without using on-line monitoring process. A 4 mm thick transparent methyl methacrylate plate was machined to provide an array of 16 parallel V-groves with a 4 mm spacing between every two consecutive grooves. A long PMMA fiber was cemented onto these groves using some transparent epoxy. In an effort to study the feasibility of future parallel fabrication process, the fiber columns on the fiber plate were then cut without using the on-line monitoring system previously described. The depth of each of 256 cuts was predetermined through calculation using the above mentioned equations together with considerations of optical propagating losses in service loops between two consecutive columns of fibers. The initial result which showed a 68% light fluctuations among the 256 ports was not satisfactory. To alleviate this problem, V-groove fabrication and fiber cementing processes need to be improved on one hand. It was found, on the other hand, that a remedy procedure to correct such fluctuations to some extent is possible. The mirrors that are smaller than expected can obviously be enlarged by subjecting to additional and deeper cuts. The mirrors with larger than expected sizes can be re-processed to reduce the coupling efficiency by partial filling of the cuts with epoxy. In FIG. 11, a 16×16 light spot pattern generated by the reprocessed fiber plate is shown where total fluctuation is reduced to about 24% through corrections of the 27 most fluctuated spots in the total 256 spot array. Further correction is possible but may not be worth the merit as far as the total fabrication efficiency is concerned.

Example 2

Fiber Unidirectional Beam-splitter Arrays

Figure 10:
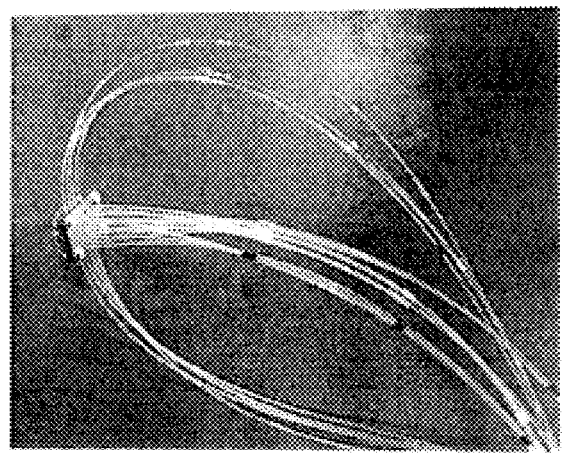
FIG. 10 illustrates a photograph of a 4×16 POF side-coupling, beam-splitting coupler.

Experimental 4×16 array couplers were fabricated using methyl methacrylate plates. The parameters are as follows. The thickness of the cover, top and bottom holding plates were 1.5 mm, 2.0 mm. and 4.0 mm, respectively. The pitch of the 16 receiving fiber through-holes was 5.0 mm in either dimension. The access hole diameter was 2.5 mm. Holes and grooves were fabricated using a conventional milling machine. The overall plate area, including the area for inserting alignment pins or screws, was 35×20 mm². The TB-1000 PMMA fibers having a core diameter of 1.0 mm were again used. All 16 receiving fibers were cemented using transparent epoxy. However, the four transmitting fibers were placed into the grooves and stabilized using screws. This procedure allows us to reuse the couplers by changing transmitting fibers for experimenting. The mirrors were cut into the transmitting fibers using a surgical blade wedged in 45°, as previously described. The cutting procedure includes a pressing motion followed by a lifting motion to make sure the formed total internal reflection mirror will not be closed. For a large $\beta=h/r$ ratio, it was difficult to obtain a flat and smooth mirror surface. Cutting with a room temperature knife usually resulted in a chipped surface because of the application of excessive force. On the other hand, cutting at a higher temperature sometimes also causes heat-induced surface expansion and deformation. However, when the ratio h/r is relatively small (h/r<0.5), the quality of the mirror surface appears good. Thus, for our measurements, mirrors were prepared with either h/r=0.1 or h/r=0.5. A picture of an array coupler thus fabricated is shown in FIG. 10. FIG. 11 shows a typical set of four eye diagrams obtained using a 155 Mb/s POF transceiver (NEC NL 2100). The LED-based transmitter power output was −4 dBm and the Si/PIN receiver's sensitivity was −26 dBm. Five meters of POF were used on each side of the beam splitter array module. No obvious model, noise-related related signal-to-noise degradation was observed when we squeezed fiber during the measurements. It was shown recently that modal noise in the large-core POF, which has millions of modes, is much less severe or influential than the modal noise in conventional multi-mode fibers where the number of modes are quite limited. See, for example, R.

Dandliker et al. (1985) "How modal noise in multimode fibers depends on source spectrum and fiber dispersion" *IEEE J. Lightwave Tech.* LT-3: 7–12.

A modular 4×4 POF cross-connector hand tool 1200 was fabricated using a configuration similar to that schematically shown in FIG. 3. A pair of 2.5 mm diameter access holes 1205 were placed at each of 16 fiber crossings. In order to pursue real-time field-execution capability of making connections, the POF hand-tool 1200, to prepare on-site mirror-cuttings, is designed and illustrated in FIGS. 12(*a*), 12(*b*), and 12(*c*). The POF hand-tool 1200 has four alignment holes 1230 on each of two bases 1210, 1220, 16 access holes 1205, a knife guide block 1240 having sixteen knife guides 1245 corresponding to the 16 access holes 1205 on either one of the two bases 1210, 1220. One of the bases 1210, 1220 preferably contains a cavity (not shown) for containing the knife guide block 1240 flush with its interior surface. The bases 1210, 1220 are preferably fabricated from a metal, such as aluminum.

Sandwiched between the bases 1210, 1220 are fiber guide plates 1215, 1225 which are notched with v-grooves 1215*a*, 1225*a*, respectively, to precisely locate the fibers. The fiber guide plates also have alignment holes 1230*a* corresponding to the alignment holes 1230 of the aluminum bases 1210, 1220 for clamping the bases 1210, 1220, guide plates 1215, 1225, and knife guide block 1240 together into a single unit with a clamping means (not shown). The clamping means is any means known the art, preferably a screw placed in each alignment hole 1230, 1230*a* and fastened with a mating nut. Alternatively, only screws can be used as the clamping means, where the alignment holes 1230 in base 1220 can be threaded with a matching thread and the alignment holes 1230, 1230*a* in base 1210 and plates 1215 and 1225, respectively, are clearance holes for the screw thread.

Figure 12A:
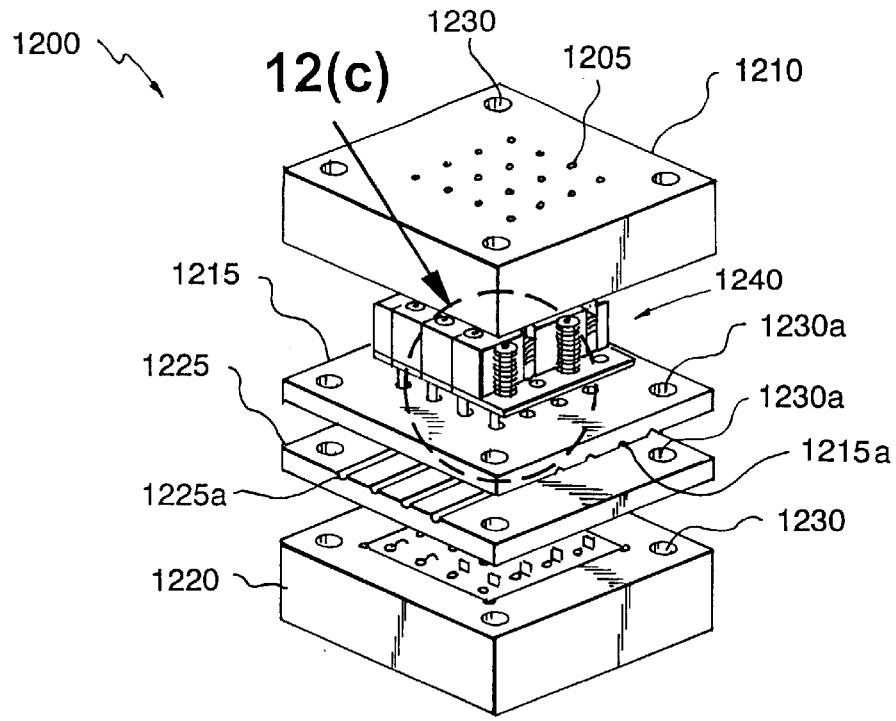
FIG. 12(a) illustrates a schematic hand-tool for real-time connection preparation using a modular 4×4 POF cross-connector having knife guides with 16 knives being inserted into both the top and the bottom aluminum holders (screw blocks), the knives being pressed to the fibers through the screws on the screw blocks, the two fiber plates in the middle being the polymer cross-connector's holding plates.
Figure 12C:
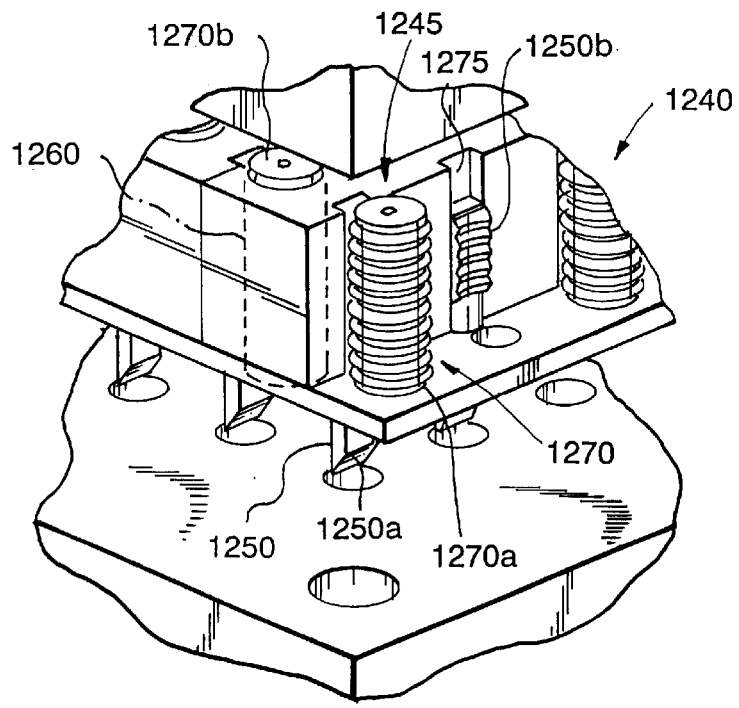
FIG. 12(c) illustrates an enlarged portion of FIG. 12 (a) showing the knife guide.
Figure 12B:
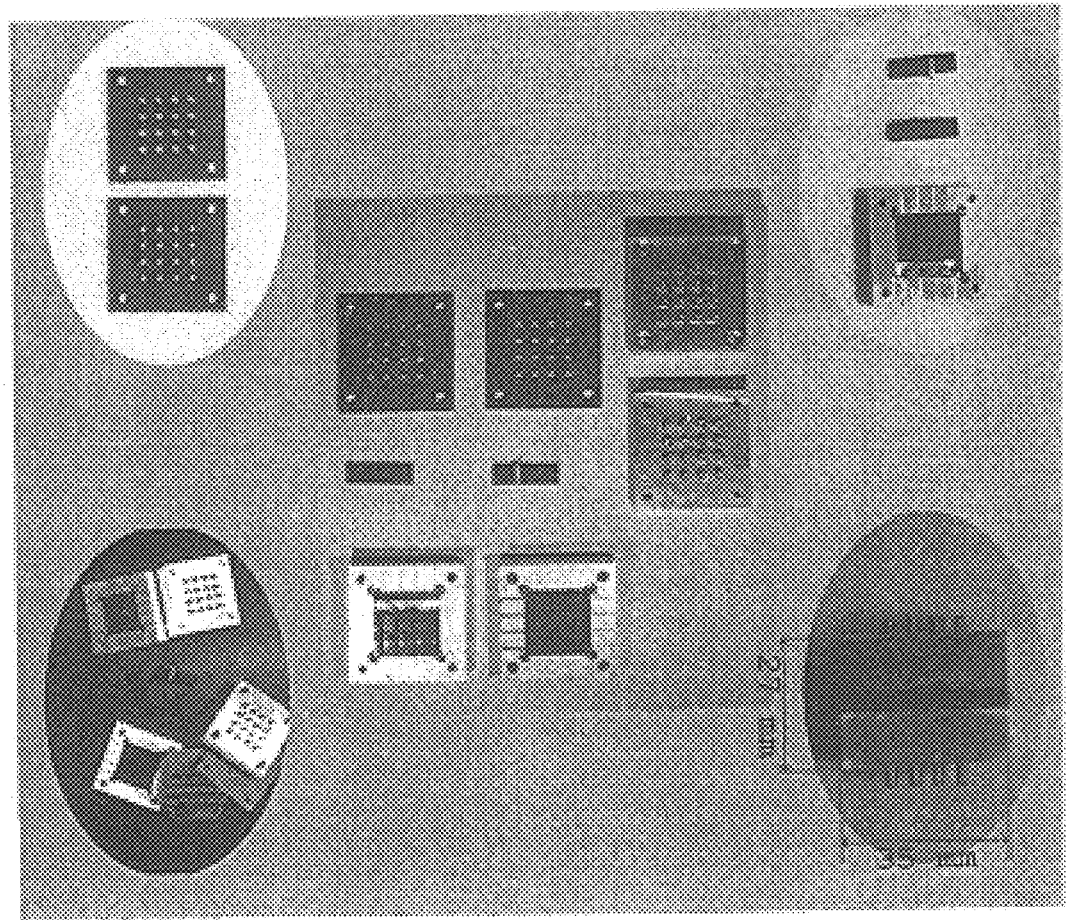
FIG. 12(b) illustrates a photograph of the components of hand-tool illustrated in FIG. 12(a)

Referring now to FIG. 12(*c*) the knife guide block 1240 is shown in greater detail in which the wall of the knife guide block 1240 is removed for clarity. The knife guide block 1240 is preferably fabricated from plastic and has sixteen knife guides 1245 corresponding to the 16 access holes 1205 on either one of the two bases 1210, 1220. Each knife guide has a socket 1260 in which is retained a set screw 1270 having a threaded portion 1270*a*. The set screw 1270 is captured in the socket 1260 thus preventing its axial movement, but is free to rotate therein. Each knife guide also has a keyway 1275 in communication with the socket 1260. A small knife 1250 (1.5×0.5×3.5 mm) is inserted into each of the keyways 1275 and is free to slide within the keyways 1275. Each knife 1250 is polished to have a cutting edge 1250*a* at one end for cutting the notch in the fiber and a threaded portion 1250*b* at another end. The cutting edge 1250*a* is preferably a 45° apex angle ground or machined onto the knife 1250. The threaded portion 1250*b* of the knife 1250 matches the threaded portion 1270*a* of the set screw 1270.

The cutting orientations among the 16 knives 1250 are identical in one base and are perpendicular to those from the other base. When cutting, each knife 1250 is pressed down into its corresponding fiber by rotating the screw 1270, which in turn engages the threaded portion of the screw 1270*a* with the threaded portion 1250*a* of the knife 1250 causing the knife to move linearly in the socket and forcing the cutting edge 1250 into the fiber, thus cutting the notch in the fiber. The set screw preferably has a socket head 1270*b* for insertion of a socket wrench therein. The socket head is accessed through the access holes 1205 in the bases 1210, 1220. Alternatively, the keyway 1275 or knife 1250 can have a stop such that the travel of the knife 1250 is limited, thus controlling the maximum depth notch that can be cut in the fiber. The POF hand-tool 1200, as illustrated in FIGS. 12(*a*) and 12(*c*) can be assembled in short time, and its operation requires minimal training. A photograph of the hand-tool is shown in FIG. 12(*b*).

Figure 13:
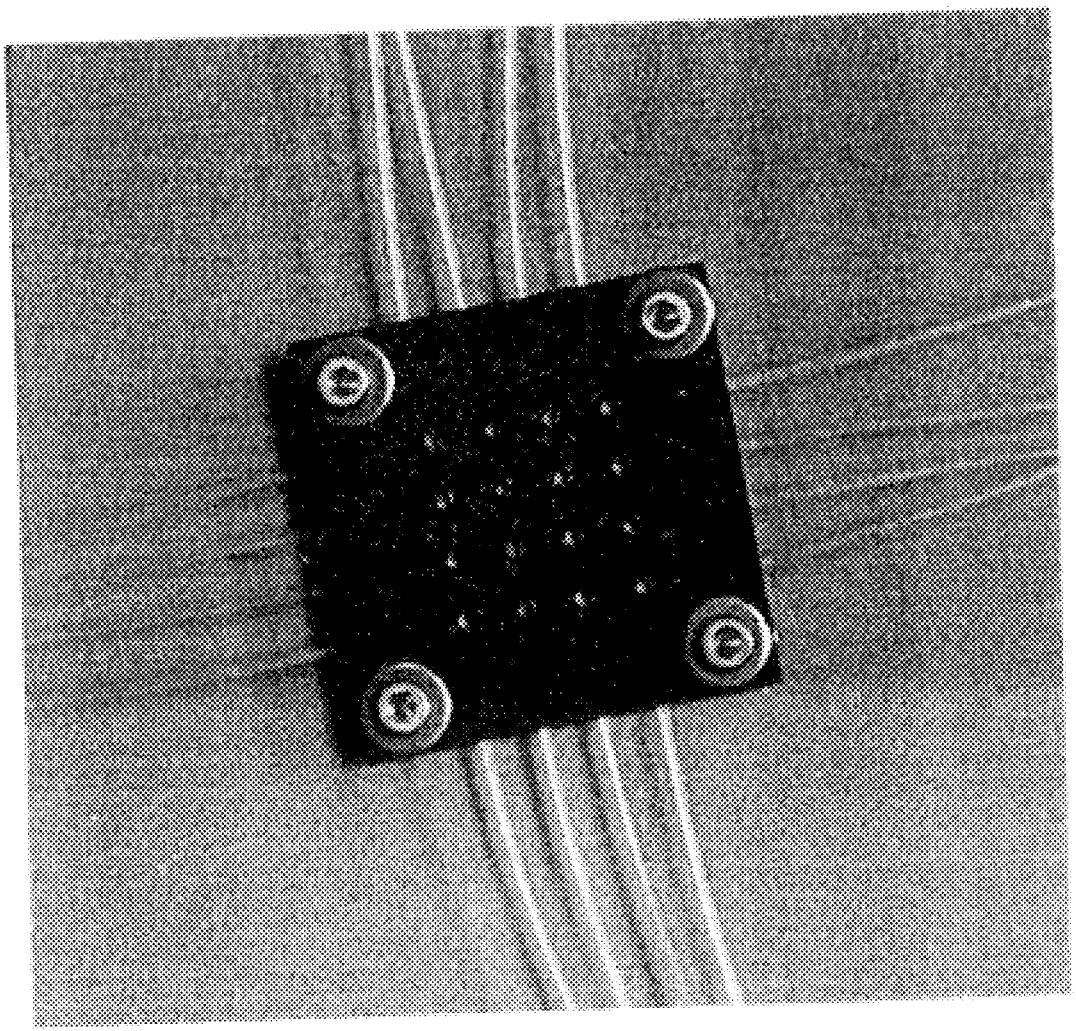
FIG. 13 illustrates a photograph of an actual 4×4 POF cross-connector.

Using the POF hand-tool 1200, several 4×4 cross-connectors were experimentally fabricated (see FIG.13 illustrating a photograph of a 4×4 POF cross-connector). One-to-four splitting was tested. The transmitting fiber had four cuts along the fiber. The amount of light coupled out of the fiber was monitored using the residue power method at its output port. The mirror efficiencies were calculated to be 0.17, 0.15 0.18 and 0.16, respectively. To couple the light into the four receiving fibers, each of the four receiving fibers was cut once at its corresponding crossing. The mirror efficiency of each receiving fiber was also measured using the same residue power method. They were 0.51, 0.53, 0.48 and 0.52, respectively. When the transmitting fiber (power splitting fiber) was re-connected to the light source to transmit light, the four receiving fibers, in an idea situation, should have their final power efficiencies of 0.086, 0.079, 0.086 and 0.083. However, our measurements indicated a set of much lower efficiencies: 0.015, 0.017, 0.018 and 0.012. In other words, the four connection locations suffered access loss of 7.6 dB, 6.7 dB, 6.8 dB and 8.4 dB, respectively. Our explanations are that the power loss contains two parts: intrinsic and extrinsic losses. The intrinsic loss is due to the fact that only a portion of light reflected from the input fiber's mirror can be collected by the receiving fiber's mirror separately located at a distance of about 1.5 mm. Given the fact that POF has an NA of about 0.5, such a loss can be about 5.8 dB. The remaining loss is extrinsic and is mainly due to spatial or angular misalignments. To reduce the access loss, it is possible to reduce the intrinsic loss by reducing the mirror separation. One of the two back-to-back mirrors has to be replaced by a metallic mirror in a back-to-front pairing fashion. In this case, the mirror separation can be effectively reduced to a half. However, the use of metallic mirrors implies that one set of mirrors has to be factory pre-fabricated. Thus, the flexibility of the cross-connector will be reduced.

Example 3

Bidirectional Couplings

Figure 14:
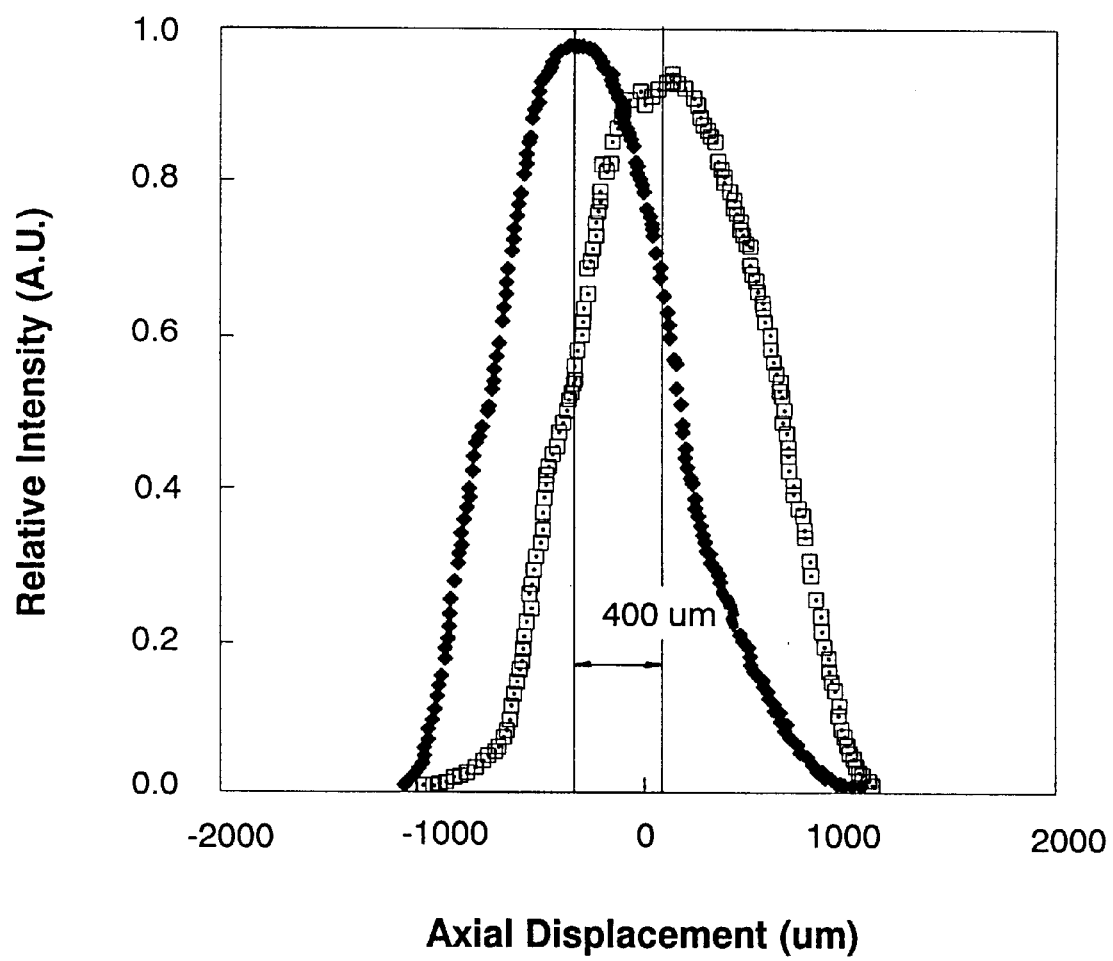
FIG. 14 illustrates bidirectional coupling efficiency curves for a typical pair of POF V-groove mirrors in comparison with the receiving fibers' axial shift.

The previously described bidirectional POF coupling 400 shown in FIG. 4(*a*) was also experimentally studied. A critical part of obtaining coupling uniformity is to precisely control the shift condition of the V-groove mirrors. To begin with, we first fabricated a V-groove mirror pair which consists of two back-to-back 45° mirror of identical cutting depth (400 $\mu$m). A transmitting POF was used to scan along the fiber axis at the back side of the POF embedded with the V-groove mirror pair. Two optical power meters were used to measure the power outputs from the two ends of the V-groove POF. The measurement results plotted in FIG. 14 clearly show that given a shift position, the two mirrors can effectively introduce two distinctive but related $\gamma$ values into the two opposite coupling directions. In order to implement the proposed bidirectional bus, it is required that for the $i^{th}$ ($1 \leq i \leq N$) mirror, the two coupling coefficients are $\gamma_i$ and $\gamma_{N-i+1}$. For a given set of parameters: N, $\alpha$ and $P_{out}/P_{in}$, the two coefficients $\gamma_i$ and $\gamma_{N-i+1}$ can be calculated. Then the data in FIG. 14 can be used to obtain an optimum amount of shift required to generated $\gamma_i$ and $\gamma_{N-i+1}$. Using this method, an N=4 bidirectional bus was first implemented using four V-groove mirrors of an identical cutting depth of 0.25 mm and four shift values of 0.12 mm, 0.13 mm, −0.13 mm and −0.12 mm, respectively. The obtained coupling efficiency data for the bus is shown in Table 1.

TABLE 1

|      | ch.1  | ch.2  | ch.3  | ch.4  |
|------|-------|-------|-------|-------|
| ch.1 | NA    | 0.024 | 0.029 | 0.023 |
| ch.2 | 0.024 | NA    | 0.032 | 0.026 |
| ch.3 | 0.029 | 0.032 | NA    | 0.023 |
| ch.4 | 0.023 | 0.026 | 0.023 | NA    |

Figure 15A:
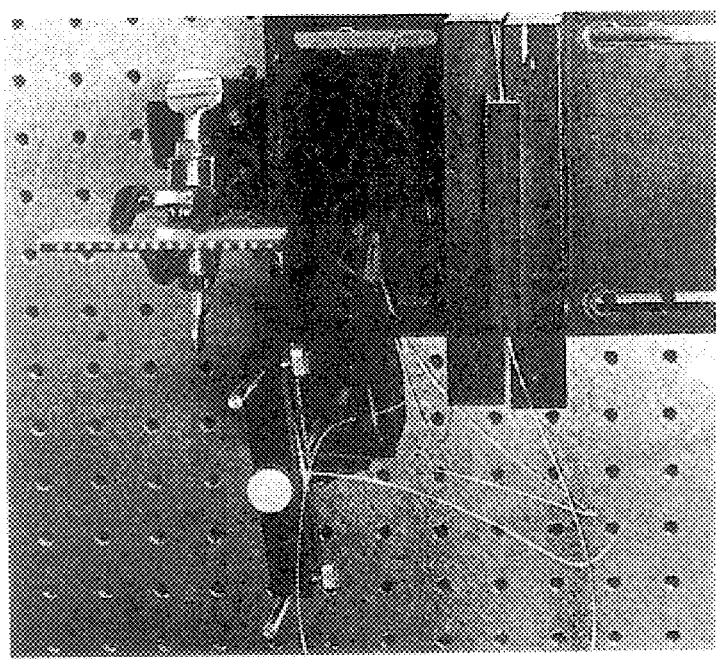
FIG. 15(a) illustrates a photograph of a 16 port, bi-directional bus coupler in operation, with reasonably uniformed outputs obtained when light was injected into the V-groove mirror embedded POF from the left side of the bidirectional coupler.
Figure 15B:
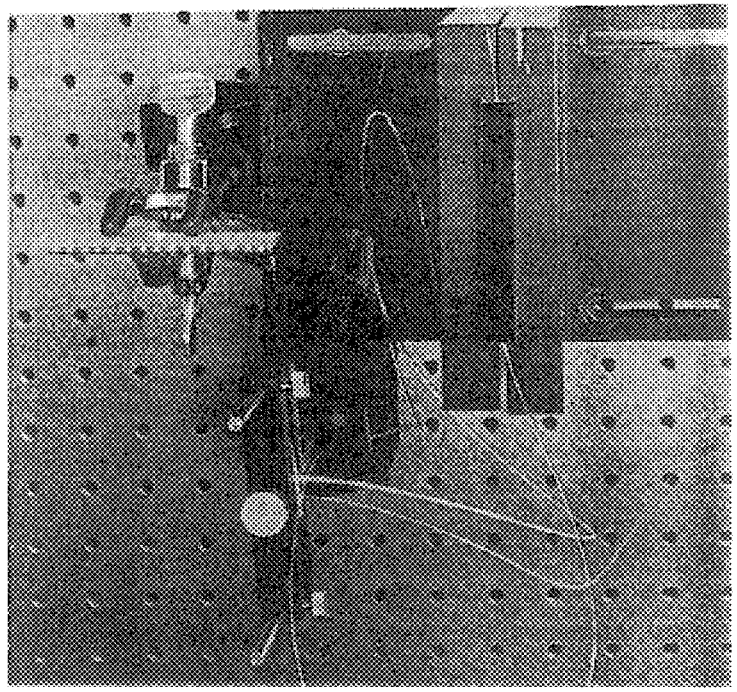
FIG. 15(b) illustrates a photograph of a 16 port, bi-directional bus coupler in operation, with reasonably uniformed outputs obtained when light was injected into the V-groove mirror embedded POF from the right side of the bidirectional coupler.

Although, the overall efficiency is quite low, the fluctuation among ports is controlled below 1.1 dB. This confirms the validity of the proposed concept. Using the same principle, an N=16 port bidirectional bus was also fabricated. Again, polymer holding blocks which can be fabricated using low-cost injection-molding technology were used to hold both the bus line fiber and the tapping fibers. Each block typically has a longitudinal dimension of 85 mm and has a cross-sectional area of 8×10 $mm^2$. A semi-circular groove was formed along the longitudinal dimension onto which the V-groove embedded fiber was cemented. Tapping fibers were introduced to the bus line fiber via through-holes. V-groove mirrors were formed through cuttings under a microscope. As compared to the N=4 case, average power efficiency was significantly reduced: From about 2.6% to about 0.07%. The fluctuation among ports increased from 1.1 dB to about 4.7 dB. In FIGS. 15(a) and 15(b), two photographs of an operational N=16 bidirectional POF bus are shown where the 16 light spots in each photo represent coupled outputs along each of the two opposite coupling directions. To the best of our knowledge, the fluctuation, which was mainly caused by mis-alignments, is not inherent. In short, although the side-coupling POF bidirectional data bus concept has been proven experimentally, its practical implementation still has a long way to go. Various intrinsic and extrinsic power loss issues have to be dealt with.

To summarize, apparatus and methods for fabricating low-cost polymer side couplers using embedded micro-mirrors in polymer fibers have been disclosed. As many as 400 coupling ports were experimentally fabricated, with an overall coupling power uniformity of better than 74%. Also disclosed are fiber-to-fiber type, low-cost array couplers in which a 4×16 version of such coupler using all polymer materials has been demonstrated. The proposed couplers can be made using low cost production process. While direct cutting can be used to form total internal reflective mirrors, metal coated mirrors are also fabricatable at additional expenses. Trade-offs can be made between the ease of fabrication and coupling efficiency. Also studied are field-executable POF cross-connectors and the hand-tools to establish real-time connections. Furthermore, uniform bidirectional couplings using side-coupling POFs were investigated. Using shifted V-groove mirrors, bidirectional buses of uniform tapping ratios were proposed and experimentally implemented. Various preliminary experiments were performed and their results have been presented and discussed hereinabove.

While there have been shown and described what are considered to be preferred embodiments of the invention and examples, it will, of course, be understood that various modifications and changes in form or detail could readily be made without departing from the spirit of the invention. It is therefore intended that the invention be not limited to the exact forms described and illustrated, but should be construed to cover all modifications that may fall within the scope of the appended claims.

What is claimed is:

1. A unidirectional optical fiber coupler comprising:

at least two input polymer optical fibers, each having a central axis for transmission of an input optical signal therealong;

at least two output polymer optical fibers, each having a central axis for transmission of an output optical signal therealong, the output optical fibers being positioned substantially perpendicular to the input optical fibers forming a grid of optical fibers;

a body in which the input and output optical fibers are housed, each input optical fiber being in optical communication with each output optical fiber at each point where the input and output optical fibers cross;

an input mirror formed within each input optical fiber and positioned at each point of crossing for reflecting inputted optical signals substantially perpendicular to their axial direction and into its corresponding output optical fiber, each input mirror comprises a notch having at least one surface angled with respect to the central axis of the optical fiber for reflecting an optical signal perpendicular to its central axis;

an output mirror formed within each output optical fiber and positioned at each point of crossing for reflecting the perpendicular optical signal from its corresponding input optical fiber to a direction along its central axis, each output mirror comprises a notch having at least one surface angled with respect to the central axis of the optical fiber for reflecting the perpendicular optical signal from its corresponding input optical fiber parallel to its central axis;

wherein, input optical signals can be coupled from any combination of the input optical fibers and transmitted into any combination of the output optical fibers.

2. The unidirectional optical fiber coupler of claim 1, wherein the body comprises an upper and lower half, and in which the input and output optical fibers are sandwiched therebetween.

3. The unidirectional optical fiber coupler of claim 2, wherein the upper and lower halves further having v-grooves for locating their respective optical fibers therein.

4. The unidirectional optical fiber coupler of claim 2, wherein at least one of the upper and lower halves further having access holes positioned at each crossing point for insertion of a knife therein to facilitate cutting of the mirror notches.

5. The unidirectional optical fiber coupler of claim 1, wherein the body further having access holes positioned at each crossing point for insertion of a knife therein to facilitate cutting of the mirror notches.

6. The unidirectional optical fiber coupler of claim 1, further comprising a metal layer deposited on the angled surface of the mirror notches for enhancing the reflectivity of the mirrors.

7. The unidirectional optical fiber coupler of claim 6, wherein the notches are filled with polymer after deposition of the metal layer.

8. The unidirectional optical fiber coupler of claim 1, wherein the angle of the angled surface with respect to the central axis of the optical fibers is 45°.

9. The unidirectional optical fiber coupler of claim 1, wherein the body comprises an upper and lower half in which the input and output optical fibers are sandwiched therebetween, at least one of the upper and lower halves further having access holes positioned at each crossing point, and further comprising a knife guide positioned at each crossing point and in communication with each access hole, each knife guide having a screw rotatably disposed in a socket and retained from axial movement and having a first threaded portion, each knife guide further having a knife slidably disposed within a keyway, the keyway being in communication with the socket, each knife having a cutting edge and a second threaded portion mating with the first threaded portion, whereby rotation of the screw, access of which is provided through its corresponding access hole, causes the cutting edge of the knife to move axially into its corresponding optical fiber thereby cutting the notch.

10. A bidirectional optical fiber coupler comprising:

a first polymer optical fiber having a central axis for transmission of optical signals therealong;

at least two tapping polymer optical fibers, each having a central axis for transmission of an optical signal therealong, the tapping optical fibers being positioned substantially perpendicular to the first optical fiber and each terminating at the first optical fiber at a side coupling;

a bidirectional mirror formed within the first optical fiber and positioned at each side coupling for reflecting optical signals from the tapping optical fiber substantially perpendicular to its axial direction and into the first optical fiber, each mirror being centered along the central axis of its corresponding tapping fiber and comprises a notch having two surfaces angled with respect to the central axis of the first optical fiber for reflecting an optical signal perpendicular to its central axis, the mirrors being shifted relative to the central axis of their corresponding tapping optical fibers such that similar output sower levels are achieved for each of the optical signals reflected in opposite directions regardless of the distance each of the two opposite signals must travel to their respective outputs;

wherein, optical signals from the tapping fibers are reflected in opposite directions along the first optical fiber.

11. The bidirectional optical fiber coupler of claim 10, further comprising a metal layer deposited on the angled surfaces of the mirror notches for enhancing the reflectivity of the mirrors.

12. The bidirectional optical fiber coupler of claim 11, wherein the notches are filled with polymer after deposition of the metal layers.

13. The bidirectional optical fiber coupler of claim 10, wherein the angle of the angled surfaces with respect to the central axis of the optical fibers is 45°.

* * * * *